United States Patent
Miyatake et al.

(10) Patent No.: US 11,277,214 B2
(45) Date of Patent: Mar. 15, 2022

(54) RADIO ENVIRONMENT ESTIMATION METHOD AND RADIO ENVIRONMENT ESTIMATION APPARATUS

(71) Applicant: NIPPON TELEGRAPH AND TELEPHONE CORPORATION, Tokyo (JP)

(72) Inventors: Ryo Miyatake, Musashino (JP); Hiroyuki Shiba, Musashino (JP); Yusuke Asai, Musashino (JP); Kohei Suzaki, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 40 days.

(21) Appl. No.: 16/968,839

(22) PCT Filed: Feb. 13, 2019

(86) PCT No.: PCT/JP2019/005102
§ 371 (c)(1),
(2) Date: Aug. 10, 2020

(87) PCT Pub. No.: WO2019/159965
PCT Pub. Date: Aug. 22, 2019

(65) Prior Publication Data
US 2021/0367691 A1    Nov. 25, 2021

(30) Foreign Application Priority Data
Feb. 13, 2018  (JP) .............................. JP2018-023576

(51) Int. Cl.
*H04B 17/391* (2015.01)
*H04B 17/309* (2015.01)
(Continued)

(52) U.S. Cl.
CPC ...... *H04B 17/3913* (2015.01); *G01S 5/02521* (2020.05); *H04B 17/309* (2015.01); *H04W 16/18* (2013.01)

(58) Field of Classification Search
CPC .............. H04B 17/3913; H04B 17/309; G01S 5/02521; H04W 16/18
See application file for complete search history.

(56) References Cited

U.S. PATENT DOCUMENTS

2010/0091668 A1* 4/2010 Sugahara ........... H04B 17/0082
370/252

OTHER PUBLICATIONS

Aleksandar Neskovic et al. "Indoor Electric Field Level Prediction Model Based on the Artificial Neural Networks." IEEE Communications Letters, vol. 4, No. 6 (2000), pp. 190-192.

* cited by examiner

*Primary Examiner* — Natasha W Cosme

(57) ABSTRACT

A synthetic reception strength value in a case of synthesizing indirect waves of radio waves generated due to an obstruction is calculated for each piece of receive antenna coordinate information in consideration of a phase of each indirect wave. Relation information indicating relation between input information and teaching information is generated. The input information is the synthetic reception strength value for each piece of the receive antenna coordinate information corresponding to transmit antenna coordinate information. The teaching information is information indicating a reception state of the radio waves being calculated using a method of actually measuring the radio waves output by the transmit antenna at a position of a receive antenna or a method other than the method of the actual measurement. Strength of the radio waves is estimated by calculating the information indicating the reception state of the radio waves
(Continued)

by using the transmit antenna coordinate information for evaluation and the generated relation information.

9 Claims, 30 Drawing Sheets

(51) Int. Cl.
*H04W 16/18* (2009.01)
*G01S 5/02* (2010.01)

HEAT MAP OF ESTIMATED
RSSI MATRIX AFTER
MACHINE LEARNING

HEAT MAP OF ACTUALLY
MEASURED RSSI MATRIX

ONE REFLECTION

TWO REFLECTIONS

RADIO ENVIRONMENT ESTIMATION METHOD AND RADIO ENVIRONMENT ESTIMATION APPARATUS

CROSS-REFERENCE TO RELATED APPLICATIONS

This application is a 371 U.S. National Phase of International Application No. PCT/JP2019/005102, filed on Feb. 13, 2019, which claims priority to Japanese Application No. 2018-023576, filed on Feb. 13, 2018. The entire disclosures of the above applications are incorporated herein by reference.

TECHNICAL FIELD

The present invention relates to a radio wave environment estimation method and a radio wave environment estimation apparatus.

BACKGROUND ART

In recent years, the technology of Internet of Things (IoT), whereby a small radio device is attached to things to collect information, has been attracting more attention. For example, the IoT technology is expected to be utilized in management operations, such as product management performed in factories, convenience stores, and the like, and temperature management performed in farms.

An access point (AP) that communicates with an IoT device is less successful in communication if the AP is installed at an inappropriate place, and in the worst case, the AP may be constantly out of services. Thus, an optimal installation position in consideration of geographical features of a building or the like needs to be selected among candidates for AP installable positions.

As a means of examining the optimal AP installation position, there is a means of installing an AP at all assumable positions and then actually measuring a reception state of an IoT device. With this means, however, actual measurement is performed for each individual position as an AP installable candidate, and thus requires a significant amount of labor and time. The IoT device, in particular, has a duty ratio of 10%, and thus requires 10 or more times as much time as that required for Wi-Fi, for example. In contrast with such means, a method called ray tracing is known, which is a method of calculating reflection, transmission, and attenuation at each obstruction through a simulation, without actually disposing an AP.

When the ray tracing method is used, reflections and transmissions of all of the propagation paths caused by obstructions present in a target region are calculated. Thus, the number of propagation paths is increased at an exponential rate according to the number of obstructions. This poses a problem that time required for calculation may be significantly prolonged depending on a structure of a building or the like.

To address the issues, in Non Patent Literature 1, a technique of constructing a model for predicting an indoor electric field level by using a neural network is proposed. According to the technique, learning processing is performed by using input information of a distance from a transmission apparatus, and an environment category obtained by categorizing environments based on the presence of a door, a window, a wall, a hallway, or the like between the transmission apparatus and a reception apparatus. The use of learned data obtained through the learning processing enables estimation of an electric field level in the reception apparatus with a small calculation period of time.

CITATION LIST

Non Patent Literature

Non Patent Literature 1: Aleksandar Neskovic et al, "Indoor Electric Field Level Prediction Model Based on the Artificial Neural Networks", IEEE COMMUNICATIONS LETTERS, VOL. 4, NO. 6, JUNE 2000

SUMMARY OF THE INVENTION

Technical Problem

When radio waves propagate in an environment including an obstruction such as a building, the environment enters a multipath state including direct waves and indirect waves, and the radio waves interfere with each other constructively or destructively due to in-phase synthesis or reverse-phase synthesis of the radio waves. Thus, to more accurately examine a radio wave state at a reception position, the phase of radio waves needs to be taken into consideration. However, there is a problem that the technique described in NPL 1 is not adequate enough to enable estimation of an electric field level in consideration of the influence from the phase.

In view of the above circumstances, the present invention has an object to provide a technique that enables estimation of the strength of radio waves and an optimal transmit antenna installation position in consideration of influence from indirect waves with a certain calculation period of time, irrespective of the number of obstructions.

Means for Solving the Problem

One aspect of the present invention is a radio wave environment estimation method including: a pre-processing step of calculating a synthetic reception strength value in a case of synthesizing indirect waves of radio waves generated due to an obstruction by using transmit antenna coordinate information, receive antenna coordinate information, and layout information, the transmit antenna coordinate information indicating a position of a transmit antenna being configured to transmit the radio waves, the receive antenna coordinate information indicating a position of a receive antenna being configured to receive the radio waves, the layout information indicating a position at which the obstruction interfering with propagation of the radio waves is located, the synthetic reception strength value being calculated for each piece of the receive antenna coordinate information in consideration of at least one of a phase or a propagation distance of each of the indirect waves; a relation information generation step of generating relation information indicating relation between input information and teaching information, the input information being the synthetic reception strength value for each piece of the receive antenna coordinate information corresponding to the transmit antenna coordinate information, the teaching information being information indicating a reception state of the radio waves being acquired using at least one of a method of actually measuring the radio waves output by the transmit antenna at the position of the receive antenna or a method other than the method of the actual measurement; and an estimation step of estimating strength of the radio waves by calculating the information indicating the reception state of the radio waves by using the transmit antenna coordinate information for evaluation and the generated relation information.

One aspect of the present invention is the above radio wave environment estimation method, further including a post-processing step of evaluating the position of the transmit antenna for evaluation by using the information indicating the reception state of the radio waves calculated in the estimation step.

One aspect of the present invention is the above radio wave environment estimation method, further including a line-of-sight determination step of determining whether or not the obstruction is present on a path of a straight line connecting the position of the transmit antenna and the position of the receive antenna by using the transmit antenna coordinate information, the receive antenna coordinate information, and the layout information, wherein, in the post-processing step, when it is determined in the line-of-sight determination step that the obstruction is present, the position of the transmit antenna for evaluation is evaluated by using the information indicating the reception state of the radio waves calculated in the estimation step, and when it is determined in the line-of-sight determination step that the obstruction is not present, a reception strength value of direct waves at the position of the receive antenna is calculated for each piece of the receive antenna coordinate information, the direct waves propagating on the path of the straight line connecting the position indicated by the transmit antenna coordinate information for evaluation and the position of the receive antenna, and the position of the transmit antenna for evaluation is evaluated by using the calculated reception strength value.

One aspect of the present invention is the above radio wave environment estimation method, wherein, in the relation information generation step, the relation information indicating the relation between the input information and the teaching information is generated through learning processing according to a machine learning method.

One aspect of the present invention is the above radio wave environment estimation method, wherein, in the post-processing step, relation information indicating relation between a plurality of pieces of the information indicating the reception state of the radio waves calculated by using a plurality of pieces of the transmit antenna coordinate information and the generated relation information and the transmit antenna coordinate information indicating a predetermined optimal position of the transmit antenna is generated in the estimation step through learning processing according to a machine learning method, and, an optimal piece of the transmit antenna coordinate information is output out of the plurality of pieces of the transmit antenna coordinate information for evaluation, based on the generated relation information and the information indicating the reception state of the radio waves, or an evaluation value for each piece of the transmit antenna coordinate information for evaluation is calculated by applying a predetermined evaluation function to the information indicating the reception state of the radio waves, and an optimal piece of the transmit antenna coordinate information is output out of the plurality of pieces of the transmit antenna coordinate information for evaluation, based on the calculated evaluation value.

One aspect of the present invention is the above radio wave environment estimation method, wherein, in the pre-processing step, a reception strength value of direct waves is calculated for each piece of the receive antenna coordinate information, the direct waves propagating on a path of a straight line between the position of the transmit antenna and the position of the receive antenna, and in the relation estimation step, in addition to the synthetic reception strength value for each piece of the receive antenna coordinate information corresponding to the transmit antenna coordinate information, the reception strength value of the direct waves for each piece of the receive antenna coordinate information corresponding to the transmit antenna coordinate information is used as the input information.

One aspect of the present invention is the above radio wave environment estimation method, wherein the information indicating the reception state of the radio waves being actually measured is at least one of any one piece of information, all of pieces of information, or freely selected two pieces of information among information of an RSSI, information of a PER, throughput information, information of a BER, information of a delay profile, information of an SNR, information of an SINR, information of a CNR, and information of a CINR.

One aspect of the present invention is the above radio wave environment estimation method, wherein, in the pre-processing step, when the indirect waves are reflected waves generated due to the obstruction, a propagation distance of each of the reflected waves is calculated, a free space propagation loss amount and a phase rotation amount at the position of the receive antenna of each of the reflected waves are calculated by using the calculated propagation distance, and the synthetic reception strength value is calculated by using the calculated free space propagation loss amount and the calculated phase rotation amount.

One aspect of the present invention is a radio wave environment estimation apparatus including: a pre-processing unit being configured to calculate a synthetic reception strength value in a case of synthesizing indirect waves of radio waves generated due to an obstruction by using transmit antenna coordinate information, receive antenna coordinate information, and layout information, the transmit antenna coordinate information indicating a position of a transmit antenna being configured to transmit the radio waves, the receive antenna coordinate information indicating a position of a receive antenna being configured to receive the radio waves, the layout information indicating a position at which the obstruction interfering with propagation of the radio waves is located, the synthetic reception strength value being calculated for each piece of the receive antenna coordinate information in consideration of at least one of a phase or a propagation distance of each of the indirect waves; and a relation estimation unit being configured to generate relation information indicating relation between input information and teaching information, the input information being the synthetic reception strength value for each piece of the receive antenna coordinate information corresponding to the transmit antenna coordinate information, the teaching information being information indicating a reception state of the radio waves being acquired using at least one of a method of actually measuring the radio waves output by the transmit antenna at the position of the receive antenna or a method other than the method of the actual measurement, and the relation estimation unit being configured to estimate strength of the radio waves by calculating the information indicating the reception state of the radio waves by using the transmit antenna coordinate information for evaluation and the generated relation information.

Effects of the Invention

According to the present invention, strength of radio waves and an optimal transmit antenna installation position can be estimated in consideration of influence from indirect waves with a certain calculation period of time, irrespective of the number of obstructions.

DESCRIPTION OF EMBODIMENTS

First Embodiment

Figure 1:
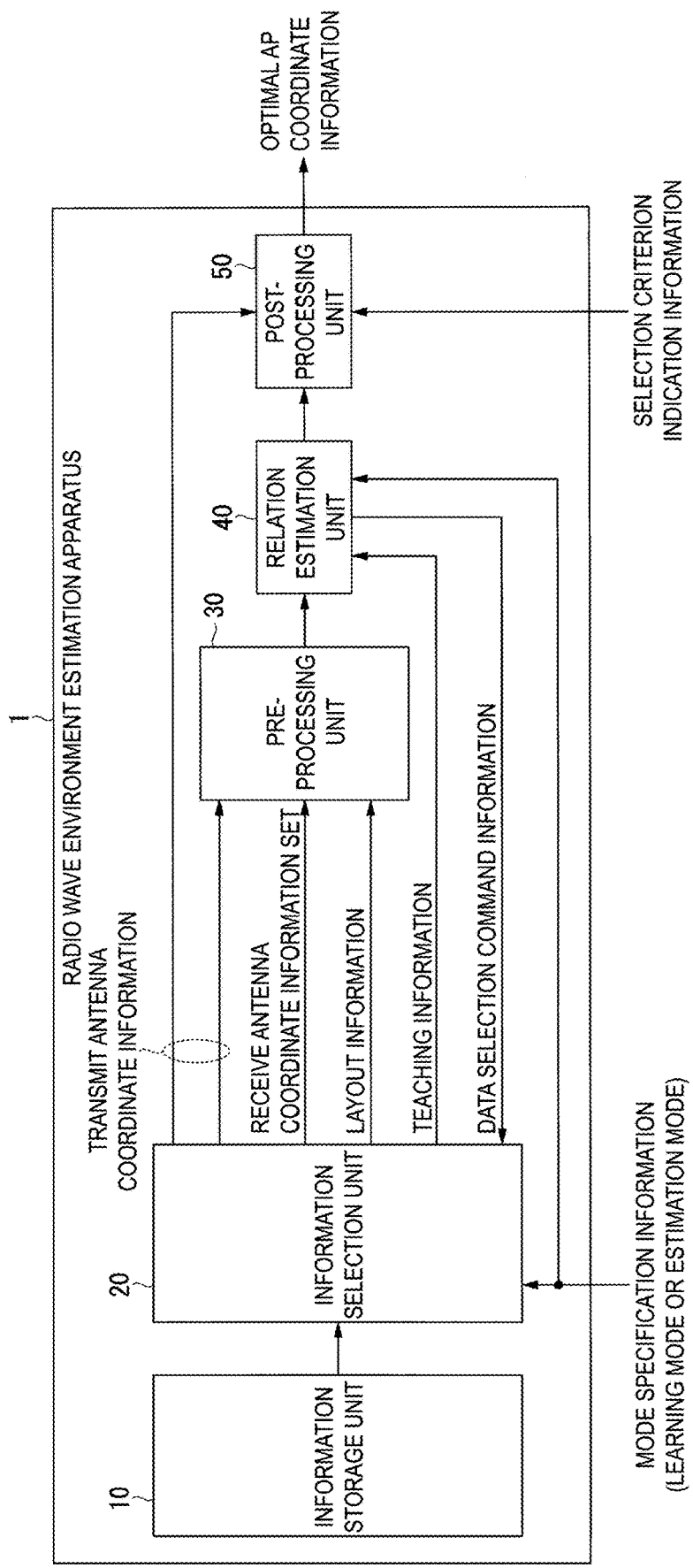
FIG. 1 is a block diagram illustrating a configuration of a radio wave environment estimation apparatus according to a first embodiment.

Embodiments of the present invention will be described below with reference to the drawings. FIG. 1 is a block diagram illustrating a configuration of a radio wave environment estimation apparatus 1 according to a first embodiment. The radio wave environment estimation apparatus 1 is, for example, an apparatus that estimates a radio wave environment between an AP, being a communication apparatus installed on a floor of a building, and an IoT device, being a communication device. The radio wave environment estimation apparatus 1 further selects an optimal position at which the AP is to be installed, for example, based on the estimated radio wave environment.

The radio wave environment estimation apparatus 1 includes an information storage unit 10, an information selection unit 20, a pre-processing unit 30, a relation estimation unit 40, and a post-processing unit 50. The information storage unit 10 stores transmit antenna coordinate information, receive antenna coordinate information, and layout information in advance, and further stores, in advance, teaching information used when the relation estimation unit 40 performs learning processing.

Each of the above pieces of information stored in the information storage unit 10 will be described below. The transmit antenna coordinate information is coordinate information indicating a position of a transmit antenna that is included in an AP installed on a floor, with the floor being represented in the XY coordinate system, for example. The receive antenna coordinate information is coordinate information indicating a position of a receive antenna that is included in an IoT device installed on a floor, with the floor being represented in the XY coordinate system in a similar manner.

The layout information is information indicating a structure of the floor, and is, for example, information extracted from image information of an imaged picture of the floor, result information of laser scanning, result information of distance measurement, construction design information, construction installation information, or the like. In one example, the layout information is information indicated by line segments arranged in two-dimension such as one indicated by the broken lines in FIG. 2 (the information indicated by the broken lines is hereinafter denoted by a reference sign 800 and is referred to as layout information 800).

The teaching information is information used when the relation estimation unit 40 performs learning processing, and is information including an actually measured received signal strength indication (RSSI) matrix and an actually measured packet error rate (PER) matrix of each piece of transmit antenna coordinate information. The RSSI matrix and the PER matrix are hereinafter also collectively referred to as a radio wave environment matrix.

Figure 2:
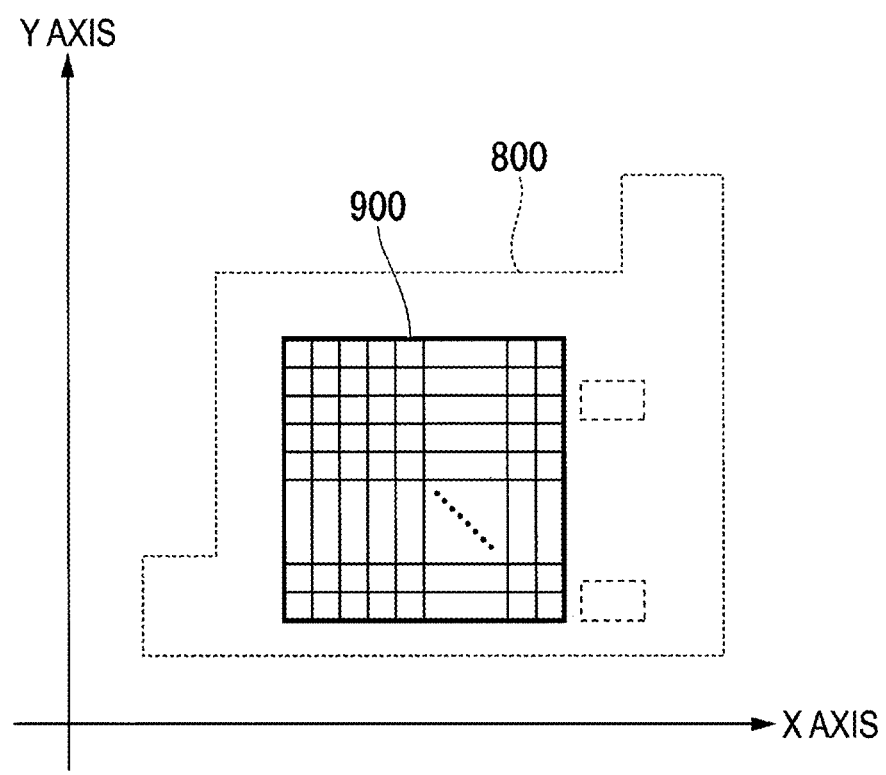
FIG. 2 is an explanatory diagram of an example of layout information and a receive antenna coordinate information set according to the first embodiment.

The meaning of the actually measured RSSI matrix and the actually measured PER matrix will be described below. As illustrated in FIG. 2, the XY coordinate system is defined for a structure of the floor indicated by the layout information 800, and an area of a quadrilateral 900 is defined inside the structure of the floor, for example. The area of the quadrilateral 900 is divided in a lattice manner, and each of the cells, being the squares of the lattice, is defined as a position at which an IoT device may be installed, i.e., receive antenna coordinates.

Any position inside or outside the area indicated by the layout information 800 is selected as a position of an AP. i.e., a position of a transmit antenna. When radio waves are output from the selected position, a reception strength value, i.e., the RSSI, of the radio waves received at each position of the cells of the quadrilateral 900 can be actually measured. A matrix in which such actually measured reception strength values are vertically and horizontally arrayed according to the positions of the cells corresponds to the actually measured RSSI matrix.

In a similar manner, a matrix in which PERs actually measured at respective positions of the cells of the quadrilateral 900 when radio waves are output from the position of the transmit antenna are vertically and horizontally arrayed according to the positions of the cells corresponds to the actually measured PER matrix.

More specifically, the information storage unit 10 stores in advance the layout information 800, and a plurality of pieces of receive antenna coordinate information (hereinafter referred to as a receive antenna coordinate information set) that correspond to respective positions of the cells of the quadrilateral 900. As the transmit antenna coordinate information, the information storage unit 10 stores in advance a plurality of pieces of transmit antenna coordinate information for learning, and pieces of transmit antenna coordinate information for evaluation used as candidates for the position at which the transmit antenna is to be actually installed. The information storage unit 10 stores in advance teaching information including a combination of the actually measured RSSI matrix and the actually measured PER matrix for each of the plurality of pieces of transmit antenna coordinate information for learning.

The information selection unit 20 reads information stored in the information storage unit 10 in accordance with mode specification information given from the outside, and outputs the read information to the pre-processing unit 30, the relation estimation unit 40, and the post-processing unit 50. For example, when the mode specification information indicates a learning mode, the information selection unit 20 reads the receive antenna coordinate information set and the layout information stored in the information storage unit 10, and outputs the read pieces of information to the pre-processing unit 30. The information selection unit 20 selects any one of the plurality of pieces of transmit antenna coordinate information for learning stored in the information storage unit 10 and reads the selected piece of transmit antenna coordinate information for learning, and outputs the read piece of transmit antenna coordinate information to the pre-processing unit 30. The information selection unit 20 reads teaching information that corresponds to the selected piece of transmit antenna coordinate information for learning from the information storage unit 10, and outputs the read teaching information to the relation estimation unit 40.

In contrast, when the mode specification information indicates an estimation mode, the information selection unit 20 reads the transmit antenna coordinate information for evaluation, the receive antenna coordinate information set, and the layout information stored in the information storage unit 10, and outputs the read pieces of information to the pre-processing unit 30. The information selection unit 20 outputs the transmit antenna coordinate information for evaluation read from the information storage unit 10 to the post-processing unit 50.

When the information selection unit 20 receives data selection command information from the relation estimation unit 40, the information selection unit 20 reads transmit antenna coordinate information for learning to be applied to the next learning processing, a receive antenna coordinate information set, and layout information from the information storage unit 10, and outputs the read pieces of information to the pre-processing unit 30.

The information selection unit 20 reads teaching information that corresponds to the transmit antenna coordinate information for learning to be applied to the next learning processing from the information storage unit 10, and outputs the read teaching information to the relation estimation unit 40.

Figure 3:
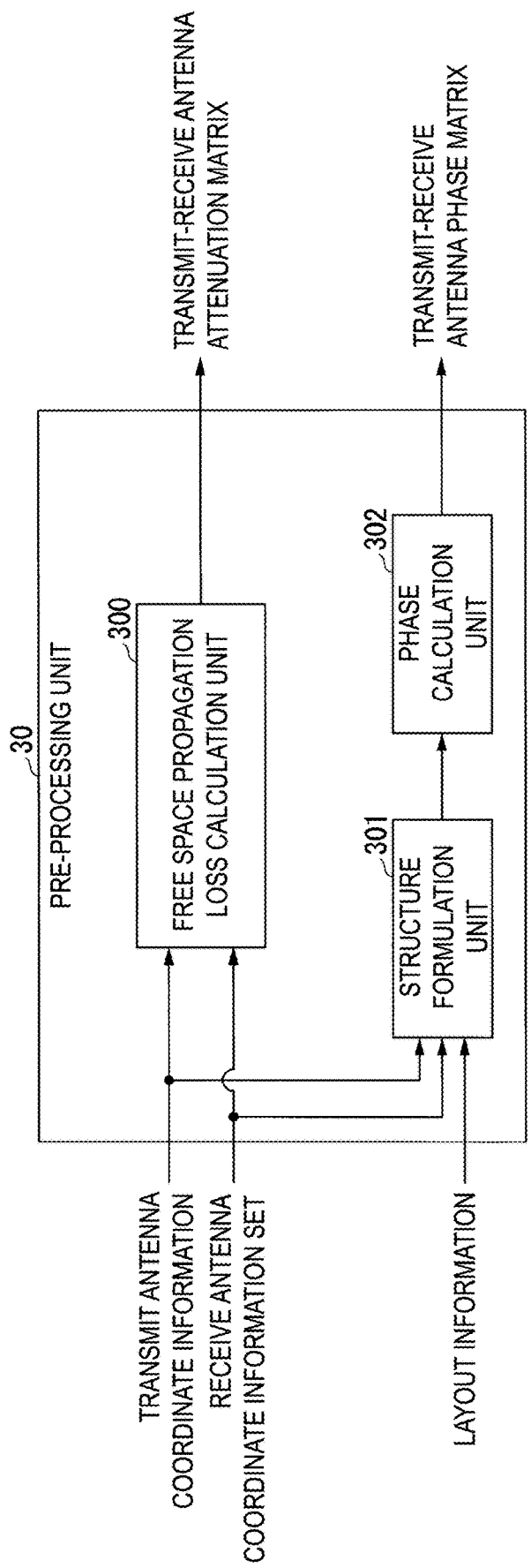
FIG. 3 is a block diagram illustrating a configuration of a pre-processing unit according to the first embodiment.

FIG. 3 is a block diagram illustrating a configuration of the pre-processing unit 30. The pre-processing unit 30 performs preprocessing to extract feature related to radio waves in a matrix format, from the transmit antenna coordinate information, the receive antenna coordinate information, and the layout information.

The pre-processing unit 30 includes a free space propagation loss calculation unit 300, a structure formulation unit 301, and a phase calculation unit 302. The free space propagation loss calculation unit 300 defines the length of each straight line connecting a position of a piece of the transmit antenna coordinate information output by the information selection unit 20 and positions of respective pieces of receive antenna coordinate information included in the receive antenna coordinate information set output by the information selection unit 20 as a propagation distance, and calculates free space propagation loss amounts by using such propagation distances. The free space propagation loss calculation unit 300 calculates received reception strength values of respective pieces of receive antenna coordinate information by using the calculated free space propagation loss amounts, and vertically and horizontally arrays the calculated reception strength values according to the positions of the pieces of receive antenna coordinate information to generate transmit-receive antenna attenuation matrices.

The structure formulation unit 301 acquires the layout information output by the information selection unit 20, and formulates the layout information into a mathematical expression, i.e., converts the layout information into a mathematical expression representing a line segment in the XY coordinate system. For example, a line segment representing an obstruction, such as a wall and a pillar, included in the layout information is formulated into a mathematical expression of a linear function with limited ranges of x and y.

The structure formulation unit 301 acquires the transmit antenna coordinate information and the receive antenna coordinate information set output by the information selection unit 20. The structure formulation unit 301 outputs a plurality of mathematical expressions formulated from the layout information, the transmit antenna coordinate information, and the receive antenna coordinate information set to the phase calculation unit 302.

The phase calculation unit 302 selects any one mathematical expression and any one piece of receive antenna coordinate information. The phase calculation unit 302 calculates free space propagation loss amounts and phase rotation amounts of reflected waves obtained when the receive antenna receives reflected waves at the selected piece of receive antenna coordinate information. Note that the reflected waves as used herein refer to such reflected waves that radio waves output from the position of the piece of transmit antenna coordinate information are reflected by an obstruction represented by the selected mathematical expression and then reach the receive antenna at the position of a corresponding piece of receive antenna coordinate information.

The phase calculation unit 302 calculates free space propagation loss amounts and phase rotation amounts for combinations of all of the mathematical expressions and all of the pieces of receive antenna coordinate information, i.e., for all of the reflected waves output from the position of the selected piece of transmit antenna coordinate information to reach the positions of respective pieces of receive antenna coordinate information via respective reflection points.

The phase calculation unit 302 adds up free space propagation loss amounts and phase rotation amounts corresponding to a plurality of mathematical expressions calculated with respect to the same piece of receive antenna coordinate information, i.e., calculates a total reception strength value at the position of the same piece of receive antenna coordinate information when all of the reflected waves reaching the position of the same piece of receive antenna coordinate information are synthesized. Note that the total reception strength value obtained when a plurality of radio waves reaching the position of the same piece of receive antenna coordinate information are synthesized is hereinafter referred to as a synthetic reception strength value. The phase calculation unit 302 vertically and horizontally arrays such calculated synthetic reception strength values according to the positions of the pieces of receive antenna coordinate information to generate transmit-receive antenna phase matrices.

Figure 4:
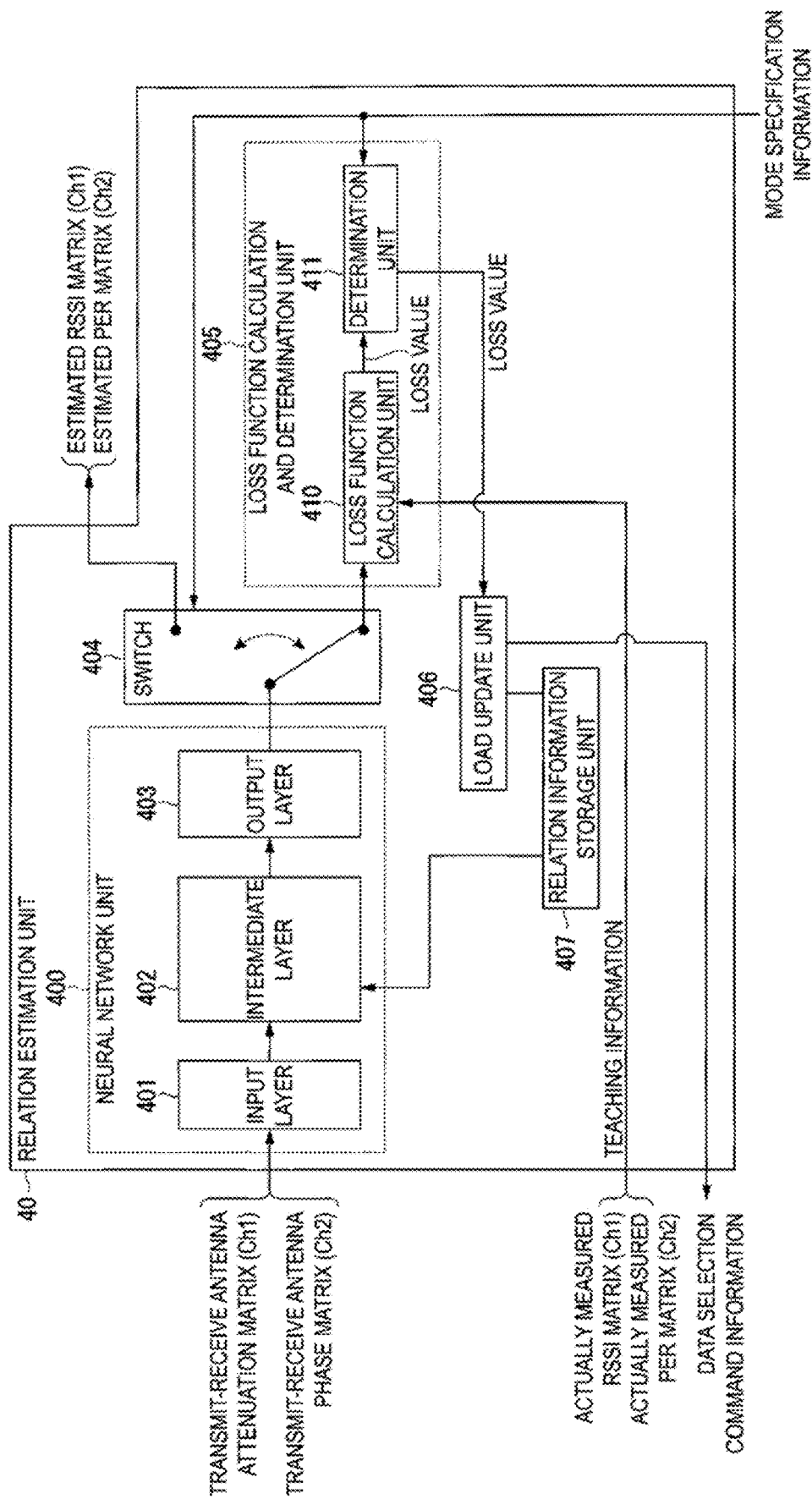
FIG. 4 is a block diagram (No. 1) illustrating a configuration of a relation estimation unit according to the first embodiment.

FIG. 4 is a block diagram illustrating a configuration of the relation estimation unit 40. The relation estimation unit 40 includes a neural network unit 400, a switch 404, a loss function calculation and determination unit 405, a load update unit 406, and a relation information storage unit 407.

The neural network unit 400 includes an input layer 401, an intermediate layer 402, and an output layer 403.

The input layer 401 acquires the transmit-receive antenna attenuation matrices and the transmit-receive antenna phase matrices output by the pre-processing unit 30 as pieces of information of channel 1 (hereinafter referred to as Ch 1) and channel 2 (hereinafter referred to as Ch 2), respectively.

The intermediate layer 402 performs computation based on values of elements of each transmit-receive antenna attenuation matrix output by the input layer 401 and weight coefficients stored in the relation information storage unit 407. Then, the intermediate layer 402 outputs computation results to the output layer 403. The intermediate layer 402 performs computation based on values of elements of each transmit-receive antenna phase matrix output by the input layer 401 and weight coefficients stored in the relation information storage unit 407. Then, the intermediate layer 402 outputs computation results to the output layer 403.

The output layer 403 outputs estimated RSSI matrices and estimated PER matrices that are based on the computation results of the intermediate layer 402 as pieces of information of Ch 1 and Ch 2, respectively. The switch 404 switches a connection target of an output terminal of the output layer 403, according to mode specification information given from the outside. For example, the switch 404 performs switching as follows: when the mode specification information indicates a learning mode, the switch 404 connects the output terminal of the output layer 403 to a terminal connected to the loss function calculation and determination unit 405, whereas when the mode specification information is an estimation mode, the switch 404 connects the output terminal of the output layer 403 to a terminal connected to the post-processing unit 50.

The loss function calculation and determination unit 405 includes a loss function calculation unit 410 and a determination unit 411. The loss function calculation unit 410 calculates errors between the estimated RSSI matrices output by the output layer 403 and the actually measured RSSI matrices given as the teaching information and errors between the estimated PER matrices output by the output layer 403 and the actually measured PER matrices given as the teaching information as a loss value by using a predetermined loss function. Note that, as the loss function, a loss function for calculating an error sum of squares or a tolerance entropy error is employed, for example.

The determination unit 411 determines whether or not to continue the learning processing, based on the loss value calculated by the loss function calculation unit 410 and a predetermined threshold for the loss value. When the determination unit 411 receives mode specification information indicating a learning mode, the determination unit 411 acquires a range of a variable "n" of an iteration count parameter in its internal storage area, manages the number of times of learning processing by using the iteration count parameter, and determines whether or not to continue the learning processing depending on the number of times of learning processing. When the determination unit 411 determines to continue the learning processing based on the loss value and a value of the iteration count parameter, the determination unit 411 outputs the loss value calculated by the loss function calculation unit 410 to the load update unit 406.

The load update unit 406 calculates new weight coefficients based on the weight coefficients stored in the relation information storage unit 407 and the loss value, and replaces the weight coefficients stored in the relation information storage unit 407 with the calculated new weight coefficients to update the weight coefficients. After updating the weight coefficients, the load update unit 406 outputs data selection command information to the information selection unit 20.

The relation information storage unit 407 stores initial values of weight coefficients in advance, and further stores weight coefficients replaced by the load update unit 406. When the learning processing ends, the learned weight coefficients stored in the relation information storage unit 407 serve as relation information indicating relation between input information and the teaching information.

Figure 5:
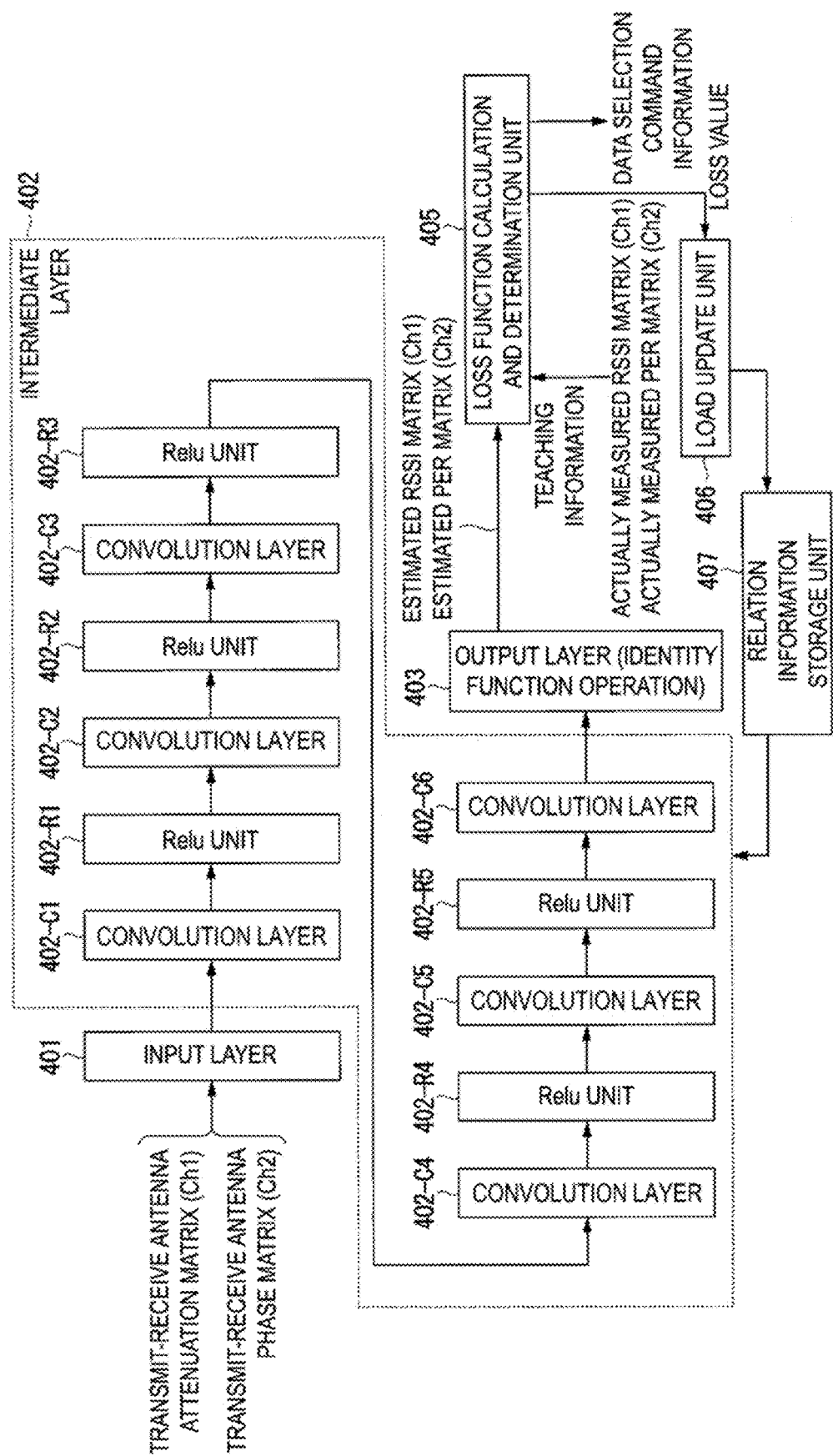
FIG. 5 is a block diagram (No. 2) illustrating a configuration of the relation estimation unit according to the first embodiment.

FIG. 5 is a diagram illustrating a configuration in which a three-dimensional neural network is used as an example of a specific configuration of the neural network unit 400 of the relation estimation unit 40. FIG. 5 illustrates a configuration in which mode specification information indicating a learning mode is given to the relation estimation unit 40 from the outside, and the output layer 403 and the loss function calculation and determination unit 405 are connected by the switch 404.

The input layer 401 acquires the transmit-receive antenna attenuation matrices as Ch 1, and acquires the transmit-receive antenna phase matrices as Ch 2. In one example, provided that the area of the quadrilateral 900 corresponding to the receive antenna coordinate set illustrated in FIG. 2 has dimensions of 28 cells in the vertical direction×26 cells in the horizontal direction, each transmit-receive antenna attenuation matrix and each transmit-receive antenna phase matrix have dimensions "28×26". Accordingly, the dimensions of output information to be output by the input layer 401 after acquisition of the transmit-receive antenna attenuation matrix and the transmit-receive antenna phase matrix are dimensions of "2×28×26", because the number of channels is 2.

The intermediate layer 402 includes six convolution layers 402-C1 to C6 and five rectified linear unit (Relu) units 402-R1 to R5. Each of the convolution layers 402-C1 to C6 performs convolution operation using the weight coefficients stored in the relation information storage unit 407 on its input information, according to the number of filters, the number of channels, the number of pixels in the vertical and horizontal directions in each filter, a value of padding, and a value of stride, which are all predetermined. Note that, in all of the convolution layers 402-C1 to C6, the value of padding is predetermined to be "1" and the value of stride to be "1".

The Relu units 402-R1 to R5 apply a Relu function, being a type of activation function, to input values, and output values obtained through the application of the Relu function.

The convolution layer 402-C1 has dimensions "16×2×3×3", with the number of filters being predetermined to be "16", the number of channels to be "2", the number of pixels in the vertical direction in each filter to be "3", and the number of pixels in the horizontal direction in each filter to be "3". The dimensions of the output information output by the input layer 401 are "2×28×26" as described above. When the convolution layer 402-C1 performs convolution operation on the output information, as many channels as the number of filters "16" are generated, converting the dimensions of output information to be output by the Relu unit 402-R1 into "16×28×26".

The convolution layer 402-C2 has dimensions "16×16×3×3", with the number of filters being predetermined to be "16", the number of channels to be "16", the number of pixels in the vertical direction in each filter to be "3", and the number of pixels in the horizontal direction in each filter to be "3". When the convolution layer 402-C2 performs convolution operation, as many channels as the number of filters "16" are generated, converting the dimensions of output information to be output by the Relu unit 402-R2 into "16×28×26".

The convolution layer 402-C3 has dimensions "32×16-3×3", with the number of filters being predetermined to be "32", the number of channels to be "16", the number of pixels in the vertical direction in each filter to be "3", and the number of pixels in the horizontal direction in each filter to be "3". When the convolution layer 402-C3 performs convolution operation, as many channels as the number of filters "32" are generated, converting the dimensions of output information to be output by the Relu unit 402-R3 into "3228×26".

The convolution layer 402-C4 has dimensions "32×32×3×3", with the number of filters being predetermined to be "32", the number of channels to be "32", the number of pixels in the vertical direction in each filter to be "3", and the number of pixels in the horizontal direction in each filter to be "3". When the convolution layer 402-C4 performs convolution operation, as many channels as the number of filters "32" are generated, converting the dimensions of output information to be output by the Relu unit 402-R4 into "32×28×26".

The convolution layer 402-C5 has dimensions "64×32×3×3", with the number of filters being predetermined to be "64", the number of channels to be "32", the number of pixels in the vertical direction in each filter to be "3", and the number of pixels in the horizontal direction in each filter to be "3". When the convolution layer 402-C5 performs convolution operation, as many channels as the number of filters "64" are generated, converting the dimensions of output information to be output by the Relu unit 402-R5 into "64×28×26".

The convolution layer 402-C6 has dimensions "2×64×3×3", with the number of filters being predetermined to be "2", the number of channels to be "64", the number of pixels in the vertical direction in each filter to be "3", and the number of pixels in the horizontal direction in each filter to be "3". When the convolution layer 402-C6 performs convolution operation, as many channels as the number of filters "2" are generated, converting the dimensions of output information into "2×28×26".

Each element of the output layer 403 is an identity function, and thus outputs the output information of the convolution layer 402-C6 directly. Accordingly, the output information of the output layer 403 has dimensions "2×28-26" and represents matrices including information of two channels, with Ch 1 representing the estimated RSSI matrix and the Ch 2 representing the estimated PER matrix.

Figure 6:
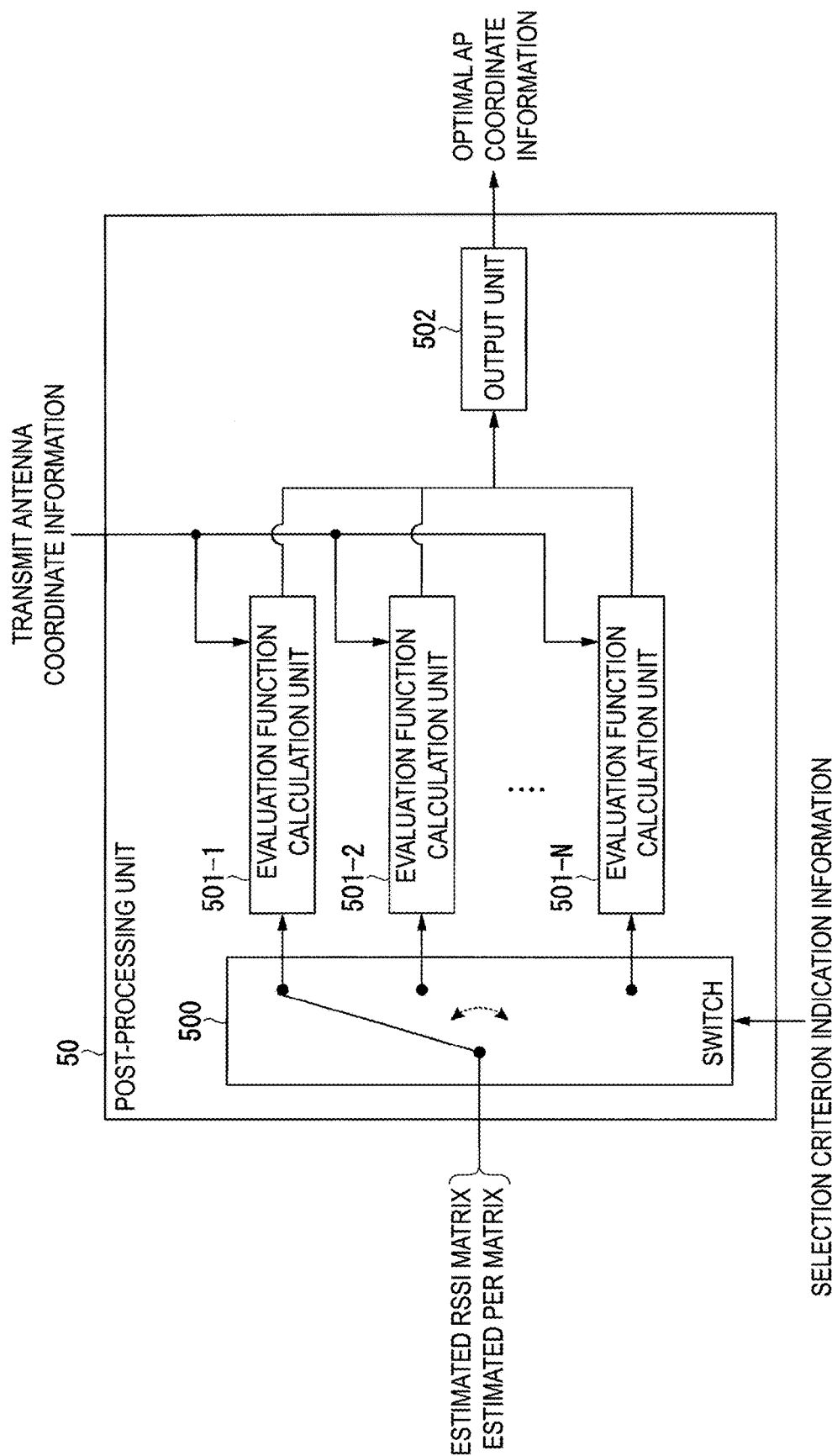
FIG. 6 is a block diagram illustrating a configuration of a post-processing unit according to the first embodiment.

FIG. 6 is a block diagram illustrating a configuration of the post-processing unit 50. The post-processing unit 50 performs post-processing to select a piece of transmit antenna coordinate information indicating an optimal position as the position of the transmit antenna from among pieces of transmit antenna coordinate information for evaluation based on the estimated RSSI matrices and the estimated PER matrices output by the relation estimation unit 40, and outputs the selected piece of transmit antenna coordinate information.

The post-processing unit 50 includes a switch 500, evaluation function calculation units 501-1 to N, and an output unit 502. The switch 500 includes one input terminal connected to an output terminal of the relation estimation unit 40, and a plurality of output terminals connected to respective evaluation function calculation units 501-1 to N. In accordance with selection criterion indication information given from the outside, the switch 500 performs switching so that the input terminal is connected to an output terminal connected to one of the evaluation function calculation units 501-1 to N according to the selection criterion indication information.

Each of the evaluation function calculation units 501-1 to N calculates an evaluation value for each piece of receive antenna coordinate information by using an evaluation function that is predetermined for each of the evaluation function calculation units 501-1 to N, based on the estimated RSSI matrix and the estimated PER matrix of each piece of transmit antenna coordinate information for evaluation. Each of the evaluation function calculation units 501-1 to N acquires pieces of transmit antenna coordinate information for evaluation output by the information selection unit 20.

Note that the order of the pieces of transmit antenna coordinate information for evaluation output by the information selection unit 20 to the pre-processing unit 30 and the order of the pieces of transmit antenna coordinate information for evaluation output thereby to the post-processing unit 50 are the same order. The pre-processing unit 30 generates transmit-receive antenna attenuation matrices and transmit-receive antenna phase matrices, based on the pieces of transmit antenna coordinate information for evaluation, the receive antenna coordinate information set, and the layout information. The relation estimation unit 40 generates estimated RSSI matrices and estimated PER matrices, based on the transmit-receive antenna attenuation matrices and the transmit-receive antenna phase matrices generated by the pre-processing unit 30. Specifically, one estimated RSSI matrix and one estimated PER matrix are obtained for each piece of transmit antenna coordinate information for evaluation.

Thus, when the evaluation function calculation units 501-1 to N associate the pieces of transmit antenna coordinate information for evaluation acquired from the information selection unit 20 with the estimated RSSI matrices and the estimated PER matrices sequentially acquired from the relation estimation unit 40 according to the order of the acquisition, the pieces of transmit antenna coordinate information for evaluation can be correctly associated with their corresponding estimated RSSI matrices and estimated PER matrices.

The evaluation function calculation units 501-1 to N associate pieces of transmit address coordinate information for evaluation that correspond to evaluation values of respective pieces of receive address coordinate information calculated based on the estimated RSSI matrices or the estimated PER matrices with the evaluation values, based on a corresponding relationship between the estimated RSSI matrices and the estimated PER matrices and the pieces of transmit antenna coordinate information for evaluation.

Each of the evaluation function calculation units 501-1 to N selects an evaluation value that satisfies a predetermined evaluation condition among the calculated evaluation values, and outputs a piece of transmit antenna coordinate information corresponding to the selected evaluation value to the output unit 502. The output unit 502 acquires the piece of transmit antenna coordinate information output by the evaluation function calculation units 501-1 to N, and outputs the acquired piece of transmit antenna coordinate information as optimal AP coordinate information indicating an optimal transmit antenna installation position, i.e., an optimal AP installation position.

Here, the transmit antenna coordinate information for evaluation is, for example, 1) selected from any positions of a floor corresponding to the layout information, or 2) selected only from an installable area known in advance, i.e., positions at which a user may actually install a transmit antenna. The known installable area is, for example, an area represented by a continuous function, or a list of discrete candidate coordinates.

One example of the evaluation function predetermined for each of the evaluation function calculation units 501-1 to N is an evaluation function for calculating a received power value for each piece of receive antenna coordinate information as an evaluation value by using an RSSI, i.e., a reception strength value, detecting a piece of receive antenna coordinate information having the lowest received power value being the evaluation value, and selecting a piece of transmit antenna coordinate information that may maximize a received power value at the detected piece of receive antenna coordinate information. A selection criterion corresponding to this evaluation function, when expressed in words, is a selection criterion that "a position of an AP that may maximize received power of an IoT device having the lowest received power among a plurality of IoT devices including a receive antenna is selected as the optimal AP installation position". The selection criterion can be expressed as the following equation (1), where $r_1$ to $r_m$ represent m pieces of transmit antenna coordinate information for evaluation, and $r_M$ represents optimal AP coordinate information.

Equation 1

$$(\text{Optimal } AP \text{ Coordinate Information } r_M) = \operatorname*{argmax}_{r}\{\min\{\text{Received Power of Each } IoT \text{ Device}\}\} \quad (1)$$

Another example of the evaluation function is an evaluation function for detecting a piece of receive antenna coordinate information having the highest PER among PERs for respective pieces of receive antenna coordinate information, and selecting a piece of transmit antenna coordinate information that may minimize a PER at the detected piece of receive antenna coordinate information. A selection criterion corresponding to this evaluation function, when expressed in words, is a selection criterion that "a position of an AP that may minimize a PER of an IoT device having the highest PER, i.e., an IoT device having the highest probability of occurrence of packet errors, among a plurality of IoT devices including a receive antenna is selected as the optimal AP installation position". The selection criterion can be expressed as the following equation (2), where $r_1$ to $r_m$ represent m pieces of transmit antenna coordinate information for evaluation, and $r_M$ represents optimal AP coordinate information. Another possible example of the evaluation function is an evaluation function in consideration of both of the PER and the RSSI.

This is, for example, an evaluation function for detecting a piece of receive antenna coordinate information having the highest value among values obtained by adding PERs for respective pieces of receive antenna coordinate information multiplied by a constant and reciprocals of RSSIs multiplied by a constant or among values obtained by subtracting RSSIs multiplied by a constant from PERs for respective pieces of receive antenna coordinate information multiplied by a constant, and selecting a piece of transmit antenna coordinate information that may minimize a value at the detected piece of receive antenna coordinate information. A selection criterion corresponding to this evaluation function, when expressed in words, is an eclectic selection criterion of equation (1) and equation (2) that "the optimal AP installation position is selected so as to reduce the presence of an IoT device having the highest value converted from the PER and the RSSI, i.e., an IoT device "having the high probability of occurrence of packet errors and the low received power" among a plurality of IoT devices including a receive antenna". The selection criterion can be expressed as the following equation (3) or the following equation (4), where $r_l$ to $r_m$ represent m pieces of transmit antenna coordinate information for evaluation, and $r_M$ represents optimal AP coordinate information.

Equation 2

$$(\text{Optimal } AP \text{ Coordinate Information } r_M) = \underset{r}{\operatorname{argmin}}\{\max\{\text{PER of Each } IoT \text{ Device}\}\} \quad (2)$$

Equation 3

$$(\text{Optimal } AP \text{ Coordinate Information } r_M) = \qquad (3)$$
$$\underset{r}{\operatorname{argmin}}\{\max((\text{Constant } 1 \times \text{PER of Each } IoT \text{ Device}) +$$
$$(\text{Constant } 2 \times 1/\text{Received Power of Each } IoT \text{ Device}))\}$$

Equation 4

$$(\text{Optimal } AP \text{ Coordinate Information } r_M) = \qquad (4)$$
$$\underset{r}{\operatorname{argmin}}\{\max((\text{Constant } 1 \times \text{PER of Each } IoT \text{ Device}) -$$
$$(\text{Constant } 2 \times \text{Received Power of Each } IoT \text{ Device}))\}$$

Figure 7:
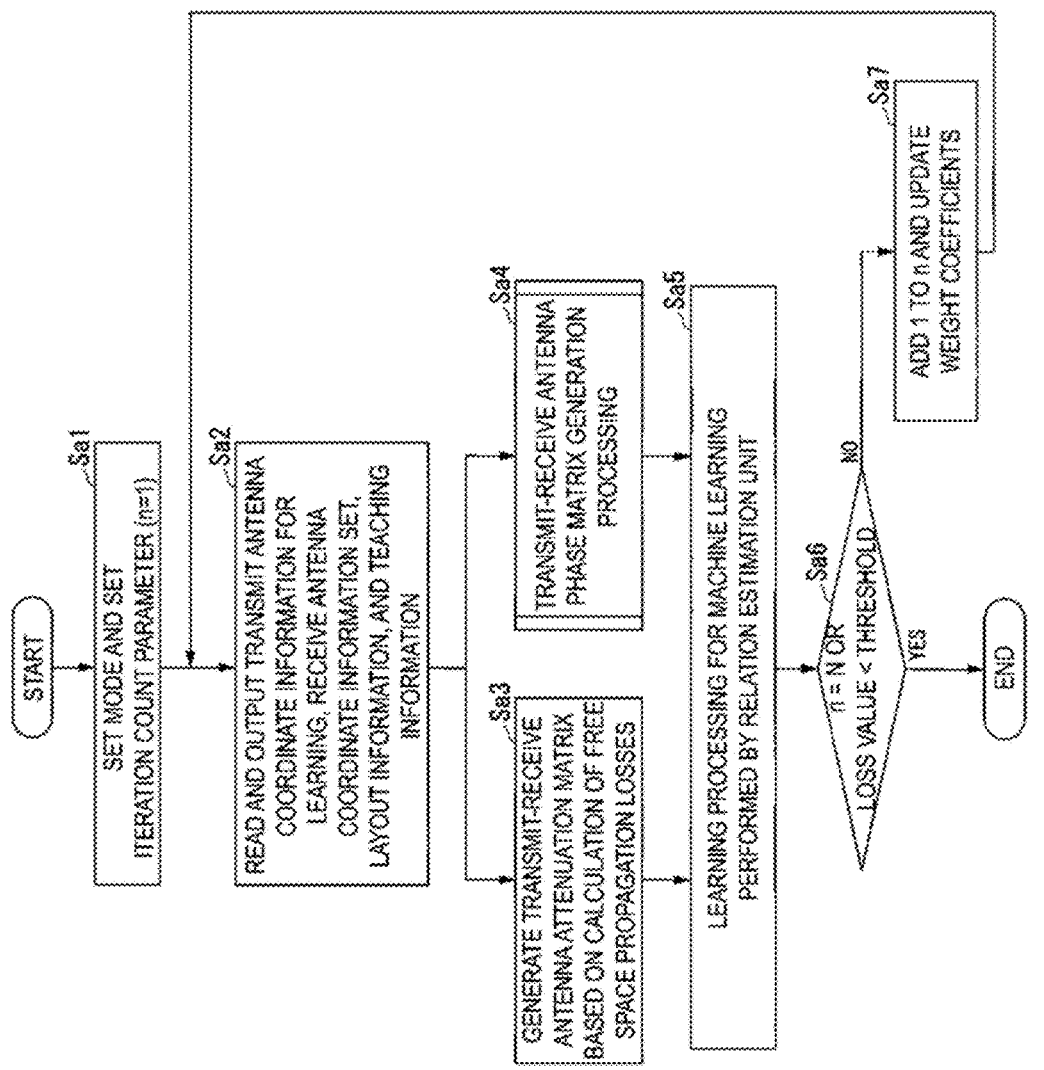
FIG. 7 is a flowchart illustrating a sequence of operations of relation information generation processing performed by the radio wave environment estimation apparatus according to the first embodiment.
Figure 8:
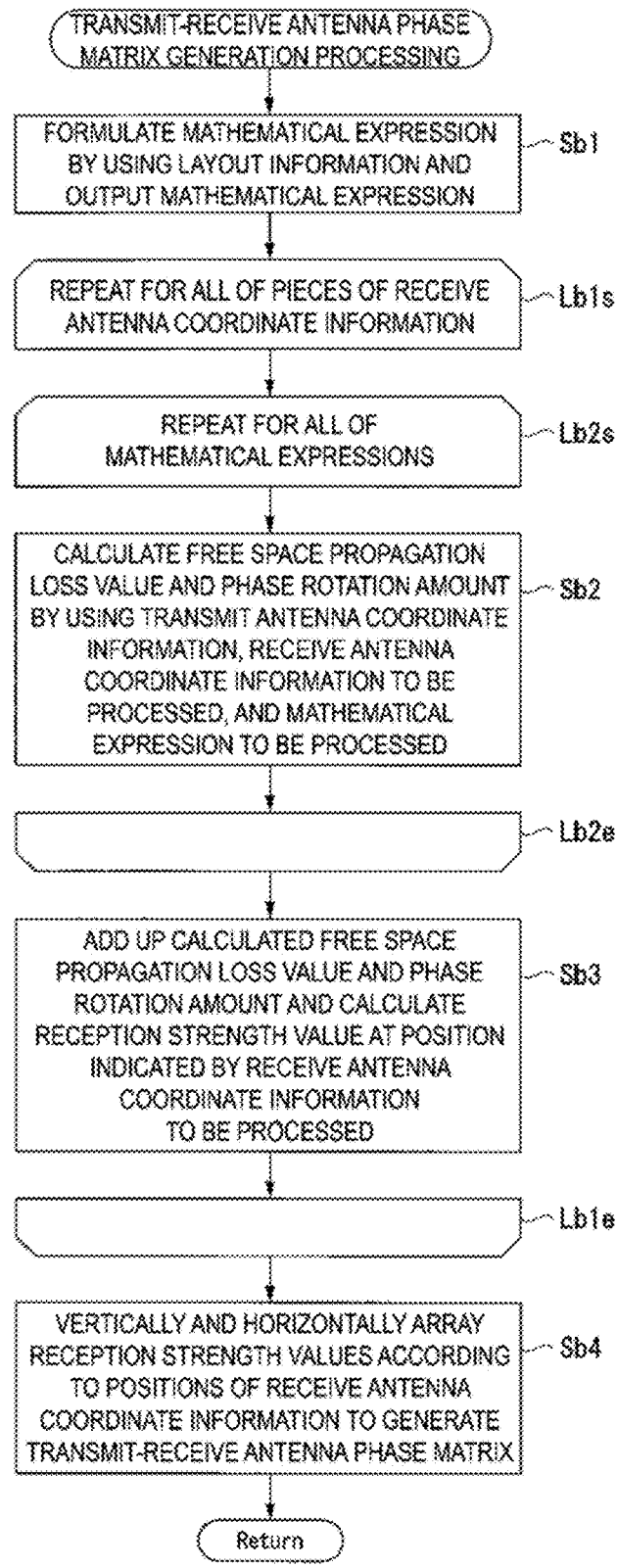
FIG. 8 is a flowchart illustrating a sequence of operations of processing performed by a phase calculation unit according to the first embodiment.

Relation Information Generation Processing Performed by Radio Wave Environment Estimation Apparatus According to First Embodiment Next, with reference to FIG. 7 to FIG. 20, a sequence of operations of processing of generating relation information performed by the radio wave environment estimation apparatus 1 according to the first embodiment will be described. FIG. 7 is a flowchart illustrating a sequence of operations of processing of generating relation information performed by the radio wave environment estimation apparatus 1, and FIG. 8 is a flowchart of a subroutine of transmit-receive antenna phase matrix generation processing called in Step Sa4 of FIG. 7.

When the switch 404 of the relation estimation unit 40 is given mode specification information indicating a learning mode from the outside, the switch 404 performs switching so that the output terminal of the output layer 403 is connected to a terminal connected to the loss function calculation and determination unit 405. The determination unit 411 of the loss function calculation and determination unit 405 of the relation estimation unit 40 writes "1" for "n" to initialize the iteration count parameter "n", and stores the written information (Step Sa1).

The information selection unit 20 selects any one among pieces of transmit antenna coordinate information for learning stored in the information storage unit 10 and reads the selected piece of transmit antenna coordinate information for learning, and further reads a receive antenna coordinate information set and layout information. The information selection unit 20 outputs the read piece of transmit antenna coordinate information for learning, the receive antenna coordinate information set, and the layout information to the pre-processing unit 30. The transmit antenna coordinate information, the receive antenna coordinate information set, and the layout information output to the pre-processing unit 30 are hereinafter also collectively referred to as propagation environment information.

The information selection unit 20 reads teaching information, i.e., the actually measured RSSI matrix and the actually measured PER matrix, that corresponds to the selected piece of transmit antenna coordinate information for learning from the information storage unit 10, and outputs the read teaching information to the relation estimation unit 40 (Step Sa2).

The free space propagation loss calculation unit 300 of the pre-processing unit 30 acquires the piece of transmit antenna coordinate information for learning and the receive antenna coordinate information set output by the information selection unit 20. The free space propagation loss calculation unit 300 calculates free space propagation loss amounts by using direct distances from a position of the piece of transmit antenna coordinate information to positions of respective pieces of receive antenna coordinate information included in the receive antenna coordinate information set. The free space propagation loss calculation unit 300 calculates received reception strength values at the respective pieces of receive antenna coordinate information by using the calculated free space propagation loss amounts, and vertically and horizontally arrays the calculated reception strength values according to the positions of the pieces of receive antenna coordinate information to generate transmit-receive antenna attenuation matrices (Step Sa3).

Figure 9:
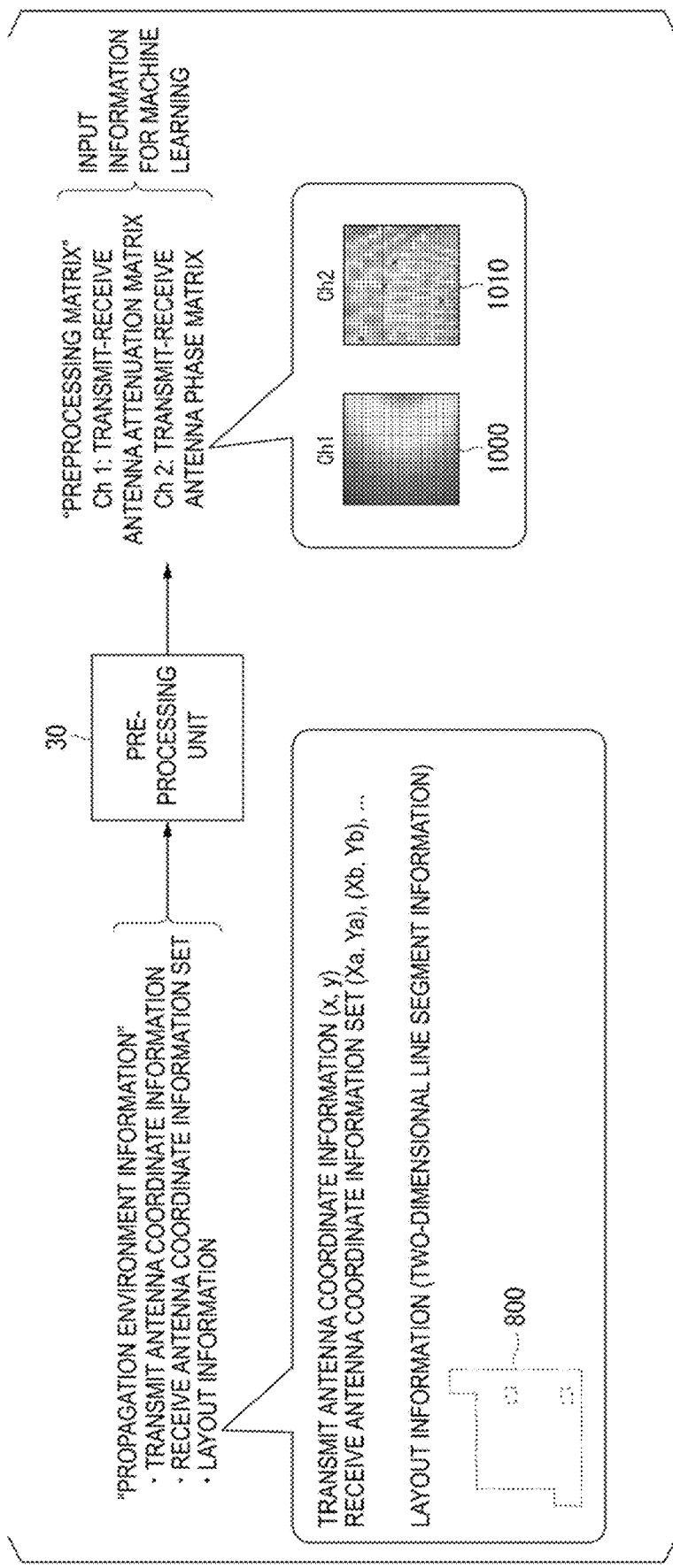
FIG. 9 is a schematic diagram of processing performed by the pre-processing unit according to the first embodiment.
Figure 10:
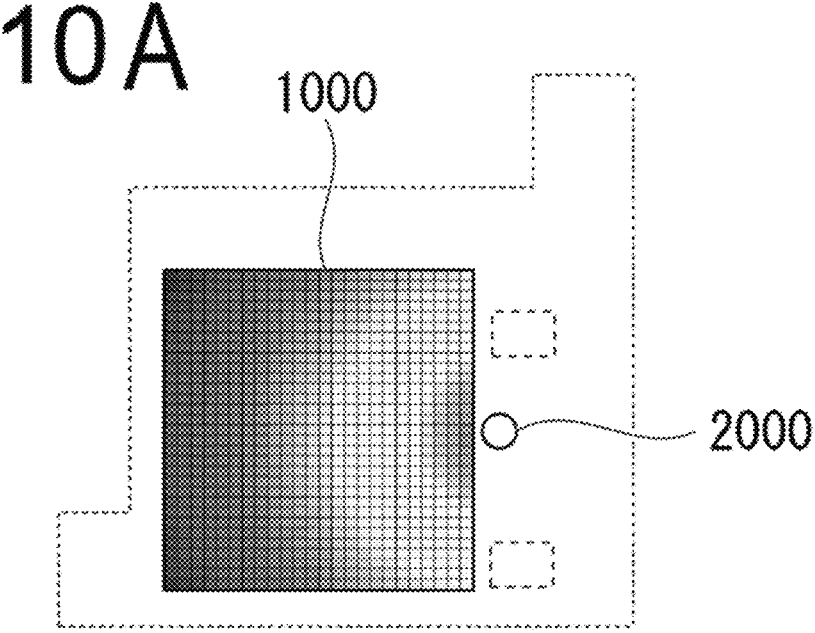
FIGS. 10A and 10B are each a diagram illustrating an example of a heat map of a transmit-receive antenna attenuation matrix according to the first embodiment.
Figure 10:
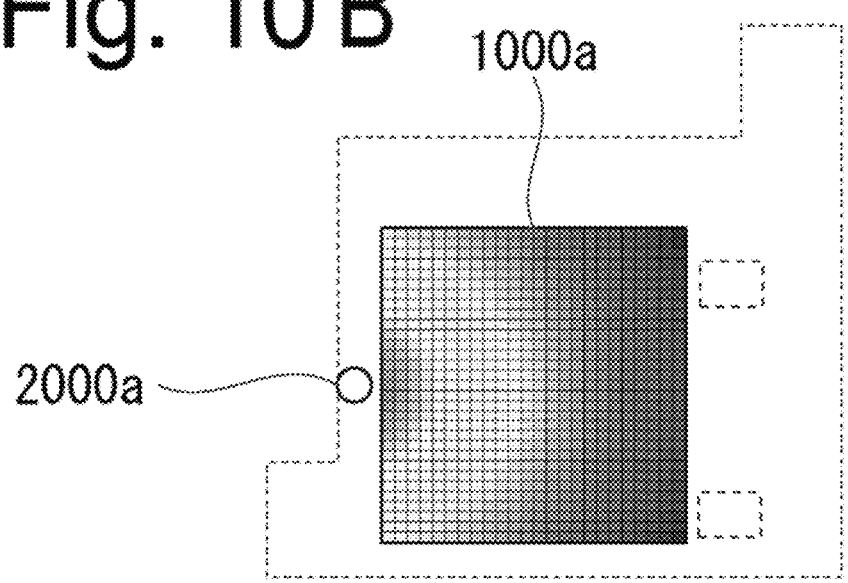

In the form of a heat map (spatial distribution), each of the transmit-receive antenna attenuation matrices is represented as such a heat map as indicated by reference signs 1000 and 1000a in FIG. 9 and FIG. 10A, for example. Note that, because a heat map is used, for example, information is displayed in colors including rainbow colors. For example, positions having large reception strength values are represented in red, and positions having small reception strength values are represented in violet. A case of a heat map of the transmit-receive antenna attenuation matrix denoted by the reference sign 1000 of FIG. 10A illustrates a case where, for example, a position of a reference sign 2000 represents a position of a transmit antenna, and reception strength values are radially gradually reduced from the position. A case of a heat map of the transmit-receive antenna attenuation matrix denoted by the reference sign 1000a of FIG. 10B illustrates a case where a position of a reference sign 2000a represents a position of a transmit antenna, and reception strength values are radially gradually reduced from the position.

Figure 11:
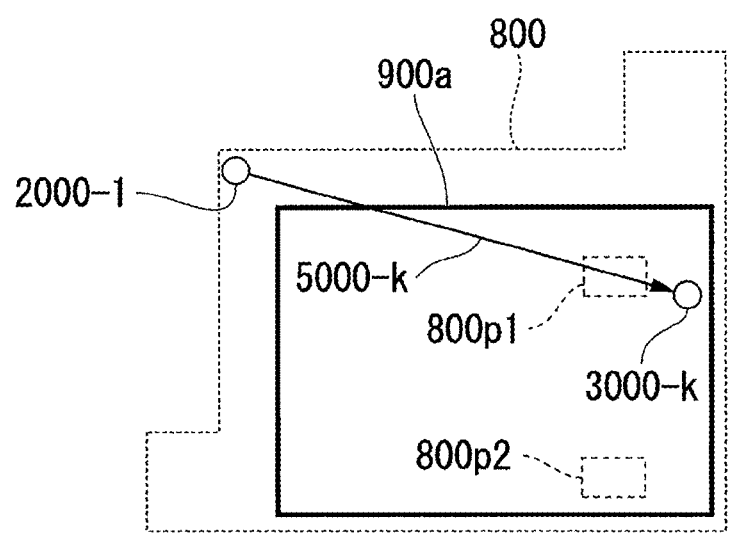
FIG. 11 is an explanatory diagram of processing performed by a free space propagation loss calculation unit of the pre-processing unit according to the first embodiment.

Note that the free space propagation loss calculation unit 300 generates the transmit-receive antenna attenuation matrices by calculating the free space propagation loss amounts, using direct distances from the position of the piece of transmit antenna coordinate information to the positions of the pieces of receive antenna coordinate information without consideration of presence or absence of an obstruction. For example, as illustrated in FIG. 11, in a case that a quadrilateral 900a is defined as an area of a receive antenna coordinate information set in the layout information 800, the area of the quadrilateral 900a is an area including obstructions of pillars indicated by reference signs 800p1 and 800p2. This implies that, as illustrated in FIG. 11, an obstruction such as the pillar indicated by the reference sign 800p1 may be present between a position of transmit antenna coordinates 2000-1 and a position of freely-selected receive antenna coordinates 3000-$k$. In such a case, the free space propagation loss calculation unit 300 calculates the free space propagation loss amount by using a direct distance from the position of the transmit antenna coordinates 2000-1 to the position of the receive antenna coordinates 3000-k, assuming that there is no obstruction.

The structure formulation unit 301 starts a subroutine of transmit-receive antenna phase matrix generation processing (Step Sa4). Note that the pre-processing unit 30 may start the processing of Step Sa4 in parallel with Step Sa3, may perform Step Sa4 after Step Sa3, or may perform Step Sa3 after Step Sa4.

The structure formulation unit 301 acquires the layout information, the receive antenna coordinate information set, and the piece of transmit antenna coordinate information for learning output by the information selection unit 20. The structure formulation unit 301 formulates the acquired layout information into mathematical expressions, and thereby generates a plurality of mathematical expressions corresponding to obstructions, such as a plurality of walls and pillars, included in the layout information. The structure formulation unit 301 outputs the generated plurality of mathematical expressions, the receive antenna coordinate information set, and the piece of transmit antenna coordinate information for learning to the phase calculation unit 302 (Step Sb1).

Figure 12:
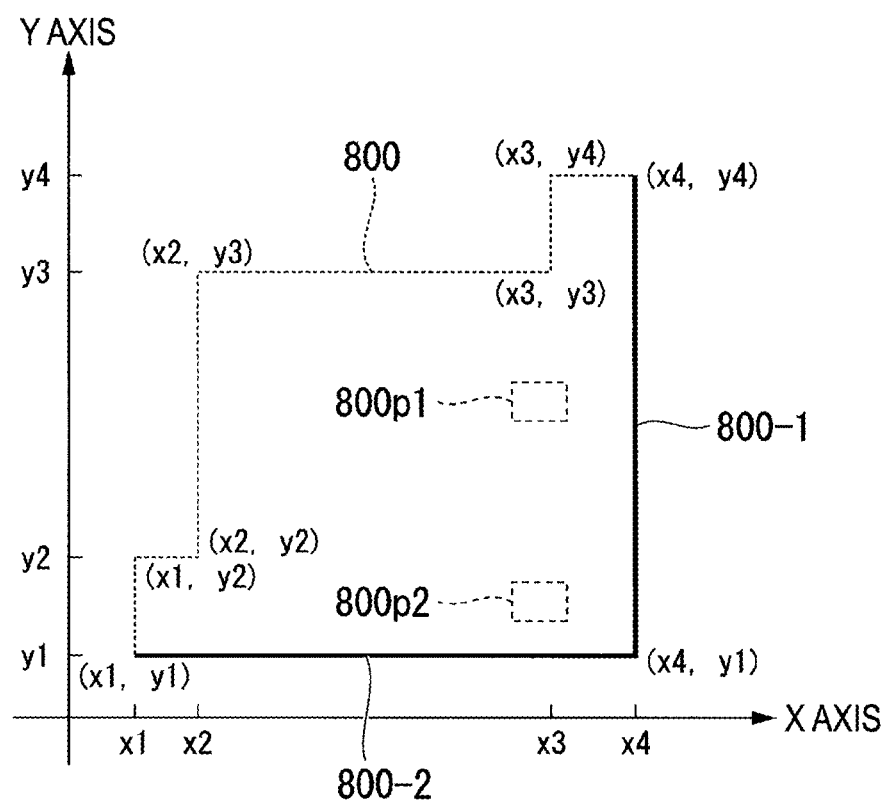
FIG. 12 is an explanatory diagram of processing performed by a structure formulation unit of the pre-processing unit according to the first embodiment.

For example, the layout information 800 includes obstructions of walls formed by lines connecting adjacent vertices of eight vertices as illustrated in FIG. 12, and obstructions of pillars indicated by the reference signs 800p1 and 800p2. For the walls, the structure formulation unit 301 formulates each line segment connecting adjacent vertices into a mathematical expression. For example, the structure formulation unit 301 formulates a line segment 800-1 connecting (x4, y1) and (x4, y4) into a mathematical expression: x=x4 (y1≤y≤y4). The structure formulation unit 301 formulates a line segment 800-1 connecting (x1, y1) and (x4, y1) into a mathematical expression: y=y1 (x1≤x≤x4).

Such formulation is repeated for adjacent vertices of the eight vertices. For the pillars indicated by the reference signs 800p1 and 800p2 as well, the structure formulation unit 301 formulates each line segment connecting adjacent vertices into a mathematical expression, in a similar manner to the formulation of the walls.

The phase calculation unit 302 acquires the plurality of mathematical expressions, the receive antenna coordinate information set, and the piece of transmit antenna coordinate information for learning output by the structure formulation unit 301. The phase calculation unit 302 selects any one piece of receive antenna coordinate information out of the receive antenna coordinate information set, and further selects any one mathematical expression from the plurality of acquired mathematical expressions.

Figure 13:
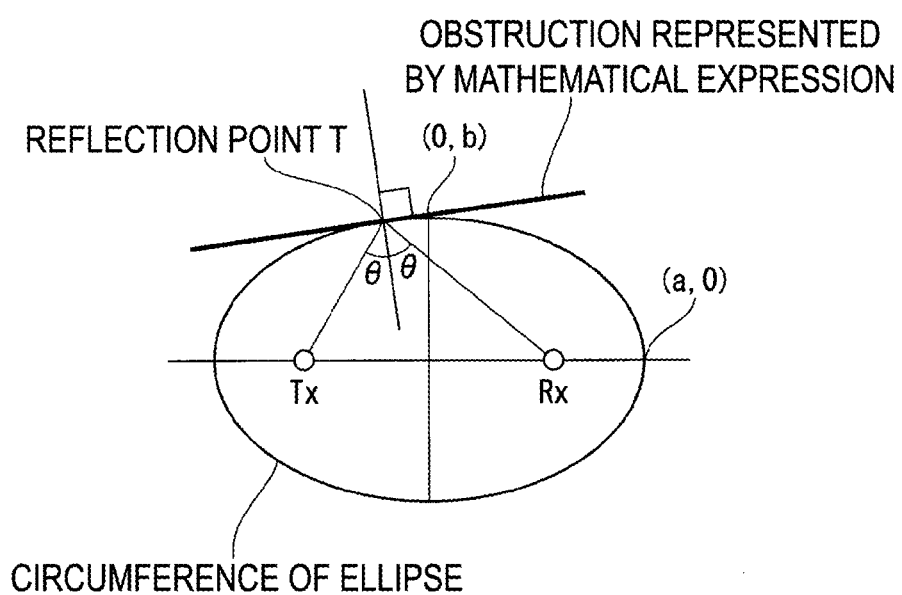
FIG. 13 is an explanatory diagram (No. 1) of processing performed by the phase calculation unit of the pre-processing unit according to the first embodiment.

The phase calculation unit 302 calculates a propagation distance and a phase rotation amount by using an elliptic function, based on the selected piece of receive antenna coordinate information, the selected mathematical expression, and the acquired piece of transmit antenna coordinate information for learning. For example, as illustrated in FIG. 13, an ellipse tangent to the obstruction represented by the acquired mathematical expression is drawn with focal points at two points of TX and RX, where TX represents a position of transmit antenna coordinate information and RX represents a position of receive antenna coordinate information. In this case, a point of tangency, at which the circumference of the ellipse and the obstruction meet, is defined as a reflection point T. As illustrated in FIG. 13, according to the geometric definition of an ellipse, the angle of incidence and the angle of reflection are the same angle θ with respect to a trajectory of a radio wave output from TX and reflected at the reflection point T of the obstruction to reach RX, and a propagation distance from TX to RX through the reflection point T is "2a" when the radius of the long side of the ellipse is defined as "a". Through application of the elliptic function utilizing such properties of an ellipse, the phase calculation unit 302 can calculate the propagation distance between TX and RX with a small amount of computation.

The phase calculation unit 302 calculates a free space propagation loss amount at the position RX corresponding to the receive antenna coordinate information by using the calculated propagation distance. The phase calculation unit 302 calculates a phase rotation amount at the position RX corresponding to the receive antenna coordinate information by using the calculated propagation distance and frequency of the radio wave. The phase calculation unit 302 associates the calculated free space propagation loss amount and phase rotation amount with the receive antenna coordinate information, and writes and stores the associated information in an internal storage area (Step Sb2).

The phase calculation unit 302 repeats the processing of Step Sb2 for all of the mathematical expressions (Loops Lb2s to Lb2e).

Figure 14:
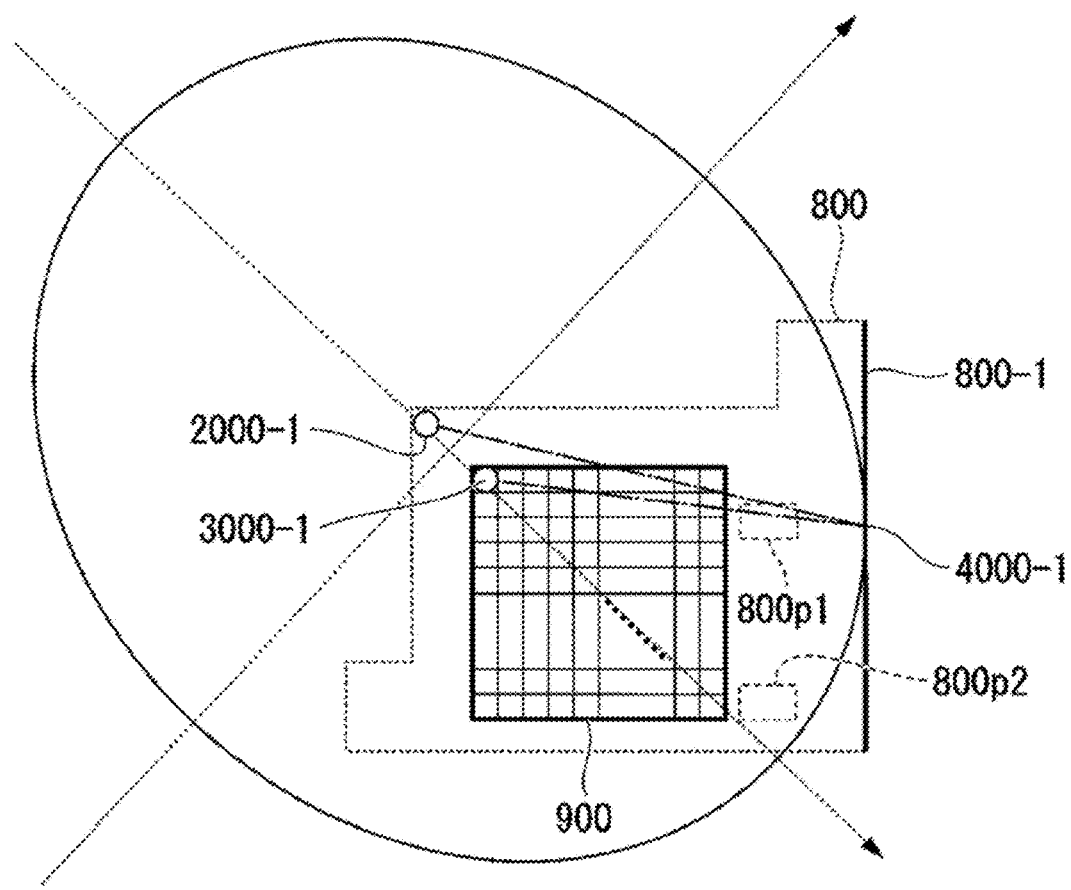
FIG. 14 is an explanatory diagram (No. 2) of processing performed by the phase calculation unit of the pre-processing unit according to the first embodiment.

An example in which the processing of Step Sb2 is applied to the layout information 800 will be described. As illustrated in FIG. 14, firstly, the phase calculation unit 302 selects a mathematical expression representing a line segment of a reference sign 800-1 as a mathematical expression representing an obstruction. The phase calculation unit 302 selects a position of a reference sign 2000-1 as a position of a transmit antenna, and selects a position of a reference sign 3000-1 at the upper left of the quadrilateral 900 as a position of a receive antenna (the positions are hereinafter referred to as transmit antenna coordinates 2000-1 and receive antenna coordinates 3000-1, respectively).

In this case, the position of the transmit antenna coordinates 2000-1 corresponds to the above-described position TX, and the position of the receive antenna coordinates 3000-1 corresponds to the above-described position RX. The phase calculation unit 302 draws an ellipse having focal points at the position of the transmit antenna coordinates 2000-1 and the position of the receive antenna coordinates 3000-1, and changes its radius until the circumference of the ellipse is tangent to the line segment 800-1. The phase calculation unit 302 defines a position of a reference sign 4000-1, which is a point of tangency between the circumference of the ellipse and the line segment 800-1, as a reflection point (hereinafter referred to as a reflection point 4000-1).

The phase calculation unit 302 calculates a distance from the position of the transmit antenna coordinates 2000-1 to the position of the receive antenna coordinates 3000-1 through the position of the reflection point 4000-1 by using an elliptic function. The phase calculation unit 302 calculates a free space propagation loss amount and a phase rotation amount obtained when the receive antenna receives a radio wave at the position of the receive antenna coordinates 3000-1, by using the calculated distance as a propagation distance.

Note that although the trajectory of the reflected wave of FIG. 14 does not overlap the shape of the pillar of the reference sign 800p1, the trajectory of the reflected wave may overlap the shape of the pillar indicated by the reference sign 800p1 or the reference sign 800p2. When the trajectory of the reflected wave overlaps an obstruction, the phase calculation unit 302 need not calculate the free space propagation loss amount and the phase rotation amount, assuming that there are no reflected waves, or may calculate the free space propagation loss amount and the phase rotation amount, assuming that there are reflected waves.

Figure 15:
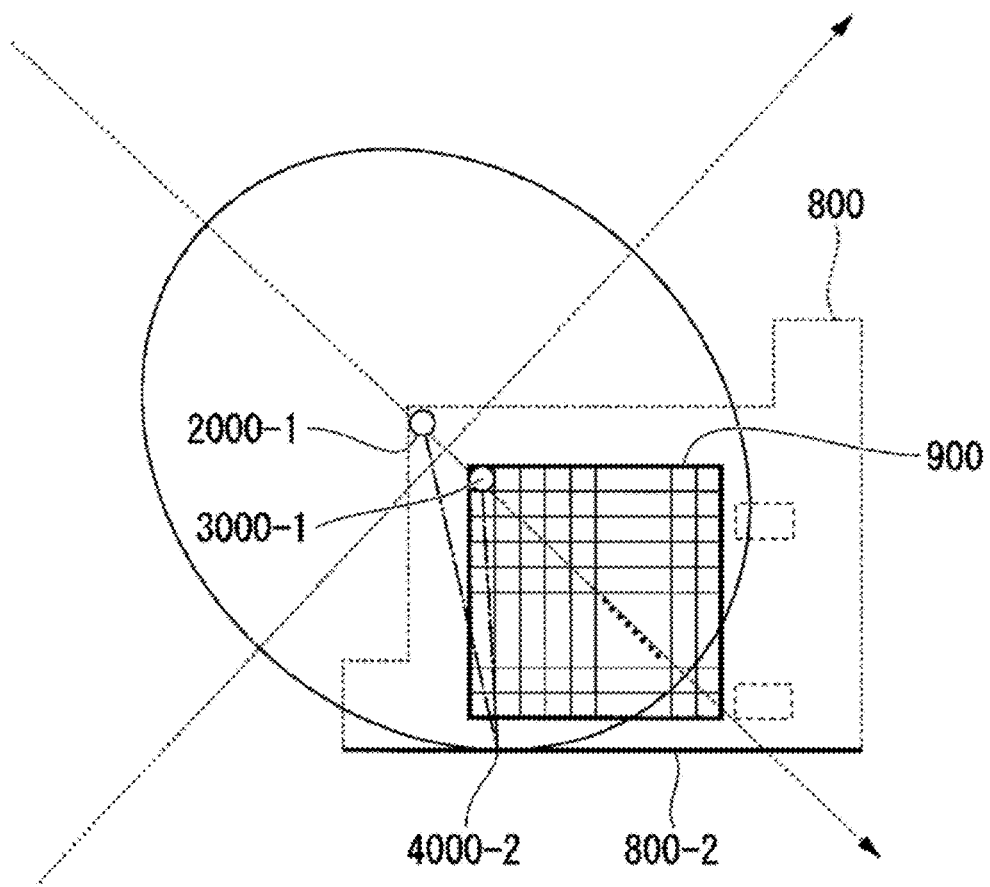
FIG. 15 is an explanatory diagram (No. 3) of processing performed by the phase calculation unit of the pre-processing unit according to the first embodiment.

Next, as illustrated in FIG. 15, it is assumed that the phase calculation unit 302 selects a mathematical expression representing a line segment of a reference sign 800-2 as a mathematical expression representing an obstruction. The phase calculation unit 302 draws an ellipse having focal points at the position of the transmit antenna coordinates 2000-1 and the position of the receive antenna coordinates 3000-1, and changes its radius until the circumference of the ellipse is tangent to the line segment 800-2. The phase calculation unit 302 defines a position of a reference sign 4000-2, which is a point of tangency between the circumference of the ellipse and the line segment 800-1, as a reflection point (hereinafter referred to as a reflection point 4000-2).

The phase calculation unit 302 calculates a distance from the position of the transmit antenna coordinates 2000-1 to the position of the receive antenna coordinates 3000-1 through the position of the reflection point 4000-2 by using an elliptic function. The phase calculation unit 302 calculates a free space propagation loss amount and a phase rotation amount obtained when the receive antenna receives a radio wave at the position of the receive antenna coordinates 3000-1, by using the calculated distance as a propagation distance.

The phase calculation unit 302 performs similar processing for combinations of the transmit antenna coordinates 2000-1 and the receive antenna coordinates 3000-1 by applying all of the mathematical expressions formulated by the structure formulation unit 301 based on the layout information 800.

Figure 16:
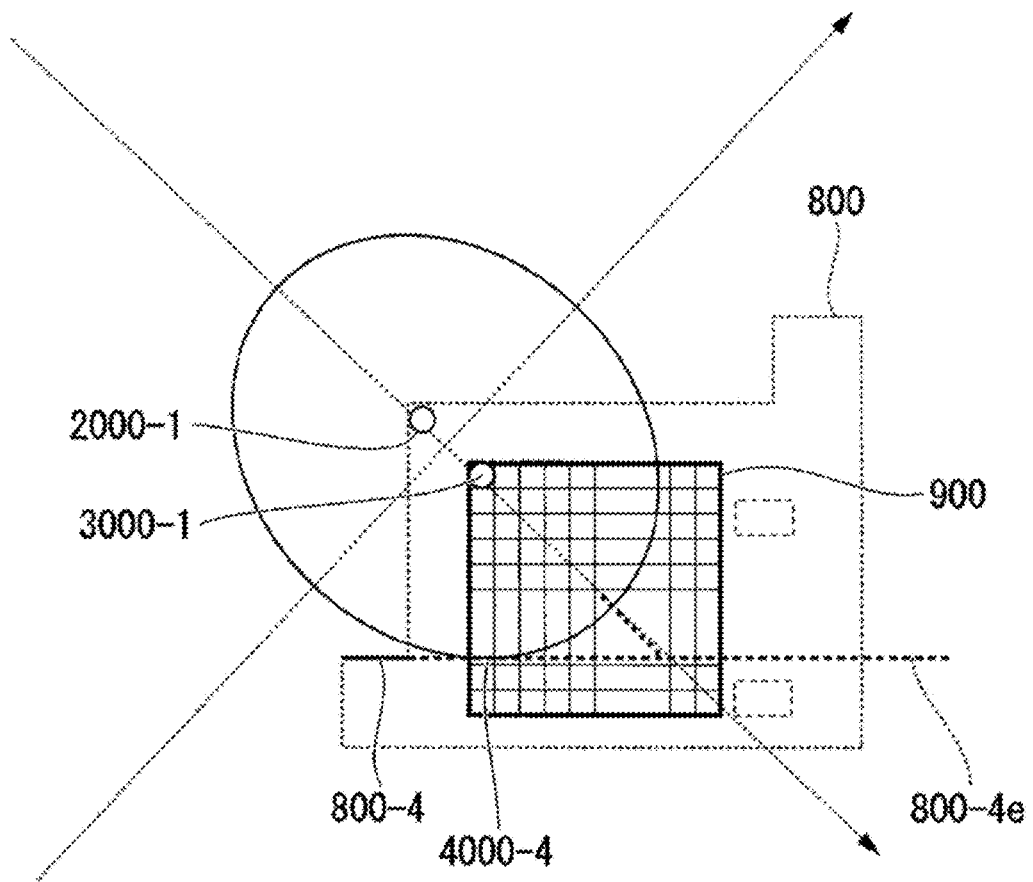
FIG. 16 is an explanatory diagram (No. 4) of processing performed by the phase calculation unit of the pre-processing unit according to the first embodiment.

Note that, in a case of a line segment 800-4 as illustrated in FIG. 16, the circumference of the ellipse does not touch the line segment 800-4. Internal processing of the phase calculation unit 302 in such a case is as follows. The phase calculation unit 302 draws a straight line 800-4e extended from the line segment 800-4, draws an ellipse whose circumference is tangent to the drawn straight line 800-4e, and thereby detects a position of a reflection point 4000-4. In a case that the detected reflection point 4000-4 is not included within the range of the line segment 800-4, the phase calculation unit 302 does not calculate a free space propagation loss amount and a phase rotation amount, assuming that there are no reflected waves.

When the processing for all of the mathematical expressions ends, the internal storage area of the phase calculation unit 302 stores free space propagation loss amounts and phase rotation amounts corresponding to a plurality of respective mathematical expressions regarding the receive antenna coordinates 3000-1. The phase calculation unit 302 calculates a synthetic reception strength value at the receive antenna coordinates 3000-1 by adding up all of the free space propagation loss amounts and the phase rotation amounts (Step Sb3).

For example, radio waves with power of a milliwatt are transmitted from the position of the transmit antenna coordinates 2000-1. The reception strength value of the radio waves received at the position of the receive antenna coordinates 3000-1 through the reflection point 4000-1 on the line segment 800-1 illustrated in FIG. 14 is $\alpha_1$ due to free space propagation losses, and the phase rotation amount is $\phi_1$. The reception strength value of the radio waves received at the position of the receive antenna of the reference sign 3000-1 through the reflection point 4000-2 on the line segment 800-2 illustrated in FIG. 15 is $\alpha_2$ due to free space propagation losses, and the phase rotation amount is $\phi2$.

Note that the following relationships hold: $\alpha_1 < a$ and $\alpha_2 < \alpha$.

A synthetic reception strength value a obtained by synthesizing the reflected waves through the two reflection points 4000-1 and 4000-2 can be expressed as the following equation (3).

$$\sigma = \alpha_1 \exp(j\phi_1) + \alpha_2 \exp(j\phi_2) \quad (3)$$

If the two reflected waves are in phase, the following equation holds: Synthetic reception strength value $\sigma = \alpha_1 + \alpha_2$. If the two reflected waves are in reverse-phase, the following equation holds: Synthetic reception strength value $\sigma = \alpha_1 - \alpha_2$.

When there are n reflected waves, the synthetic reception strength value a can be calculated according to the following equation (4), which is obtained by generalizing equation (3).

$$\sigma = \alpha_1 \exp(j\phi_1) + \alpha_2 \exp(j\phi_2) + \ldots + \alpha_n \exp(j\phi_n) \quad (4)$$

The phase calculation unit 302 associates the synthetic reception strength value a calculated according to equation (4) with coordinate information of the receive antenna coordinates 3000-1, and writes and stores the associated information in the internal storage area.

Figure 17:
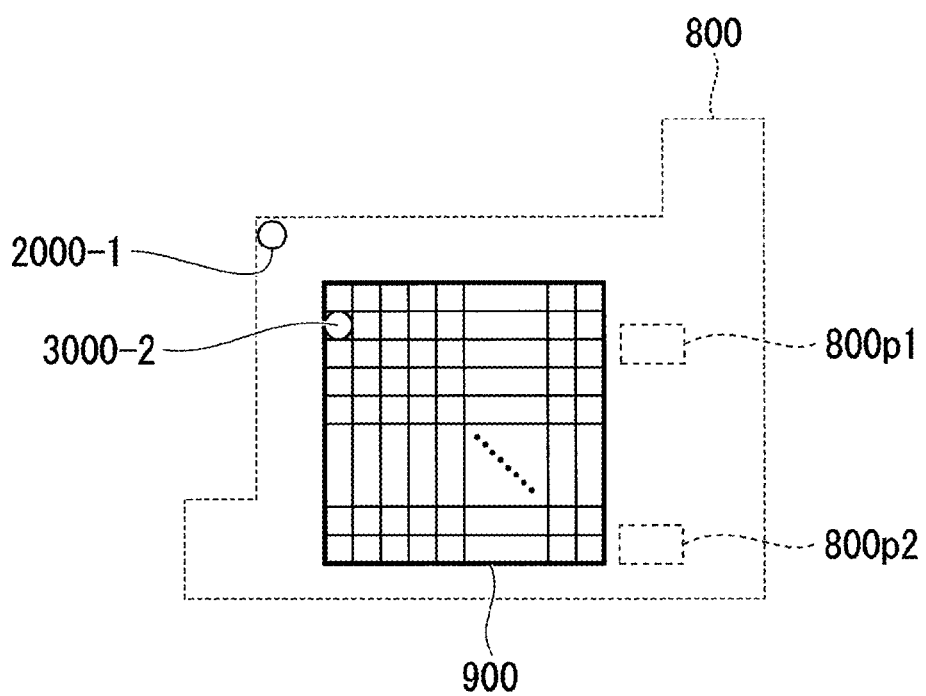
FIG. 17 is an explanatory diagram (No. 5) of processing performed by the phase calculation unit of the pre-processing unit according to the first embodiment.

After the phase calculation unit 302 performs the processing of Step Sb2 for all of the mathematical expressions, the phase calculation unit 302 selects other receive antenna coordinates 3000-2 on which the processing of Step Sb2 is not performed as illustrated in FIG. 17, for example, and repeats the processing from Loop Lb2s to Lb2e and the processing of Step Sb3 for all of the pieces of receive antenna coordinate information (Loops Lb1s to Lb1e). Note that, when other pieces of receive antenna coordinate information are selected, the selection may be made in the horizontal direction instead of repeating the selection in the vertically direction as illustrated in FIG. 17. Alternatively, random positions may be selected.

Figure 18:
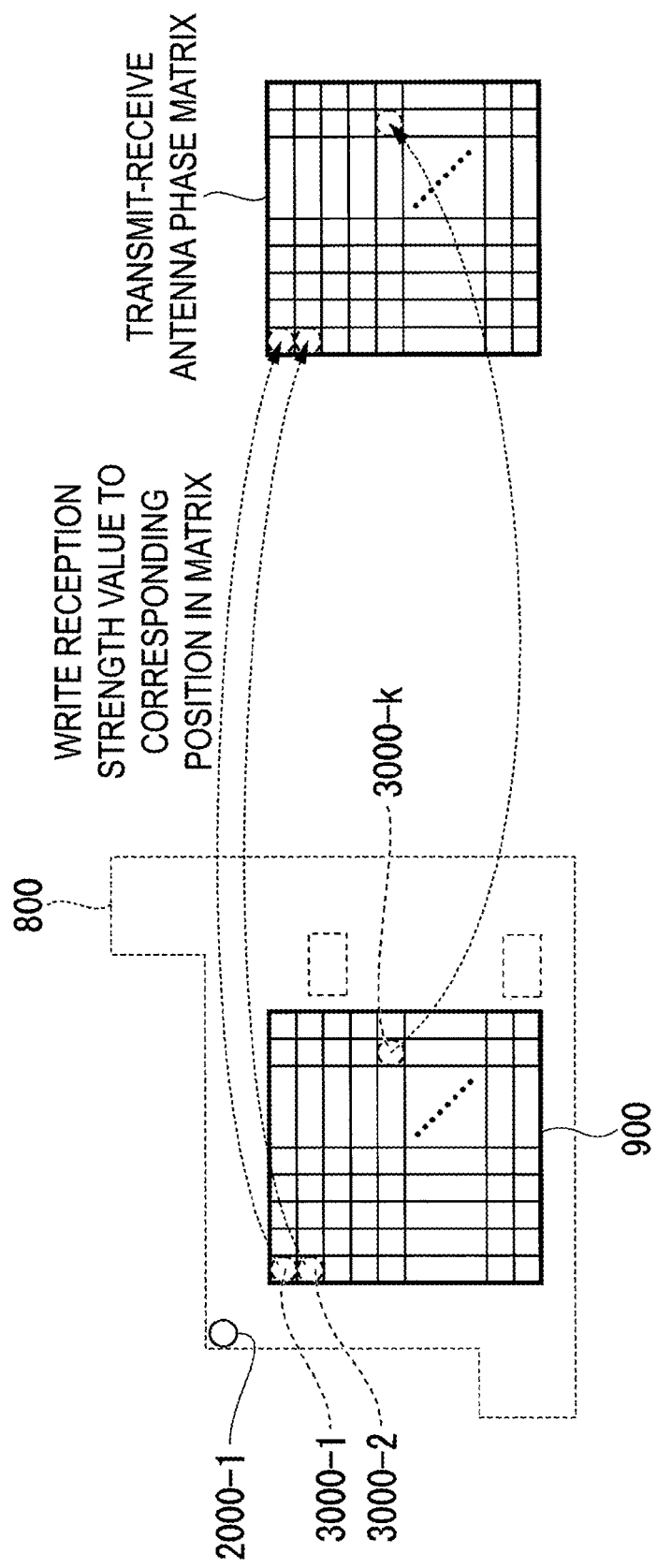
FIG. 18 is an explanatory diagram (No. 6) of processing performed by the phase calculation unit of the pre-processing unit according to the first embodiment.
Figure 19:
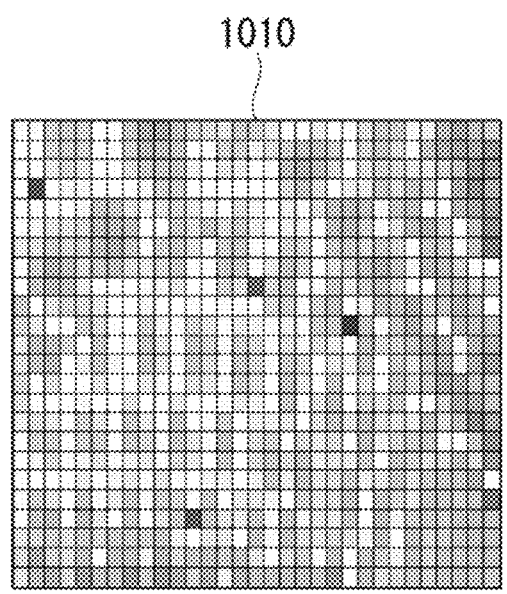
FIG. 19 is a diagram illustrating an example of a heat map of a transmit-receive antenna phase matrix according to the first embodiment.

The phase calculation unit 302 vertically and horizontally arrays such synthetic reception strength values of the respective pieces of receive antenna coordinate information stored in the internal storage area according to the positions of the pieces of receive antenna coordinate information as illustrated in FIG. 18 to generate transmit-receive antenna phase matrices (Step Sb4). In the form of a heat map, the transmit-receive antenna phase matrices generated by the phase calculation unit 302 is represented as such a heat map as indicated by a reference sign 1010 illustrated in FIG. 9 and FIG. 19. Note that, because a heat map is used, for example, information is displayed in colors including rainbow colors. For example, positions having large synthetic reception strength values are represented in red, and positions having small synthetic reception strength values are represented in violet.

The free space propagation loss calculation unit 300 and the phase calculation unit 302 of the pre-processing unit 30 output the transmit-receive antenna attenuation matrices and the transmit-receive antenna phase matrices that the respective units generated to the relation estimation unit 40. The transmit-receive antenna attenuation matrix and the transmit-receive antenna phase matrix are hereinafter also collectively referred to as a preprocessing matrix, and the preprocessing matrix corresponds to input information for learning processing.

Figure 20:
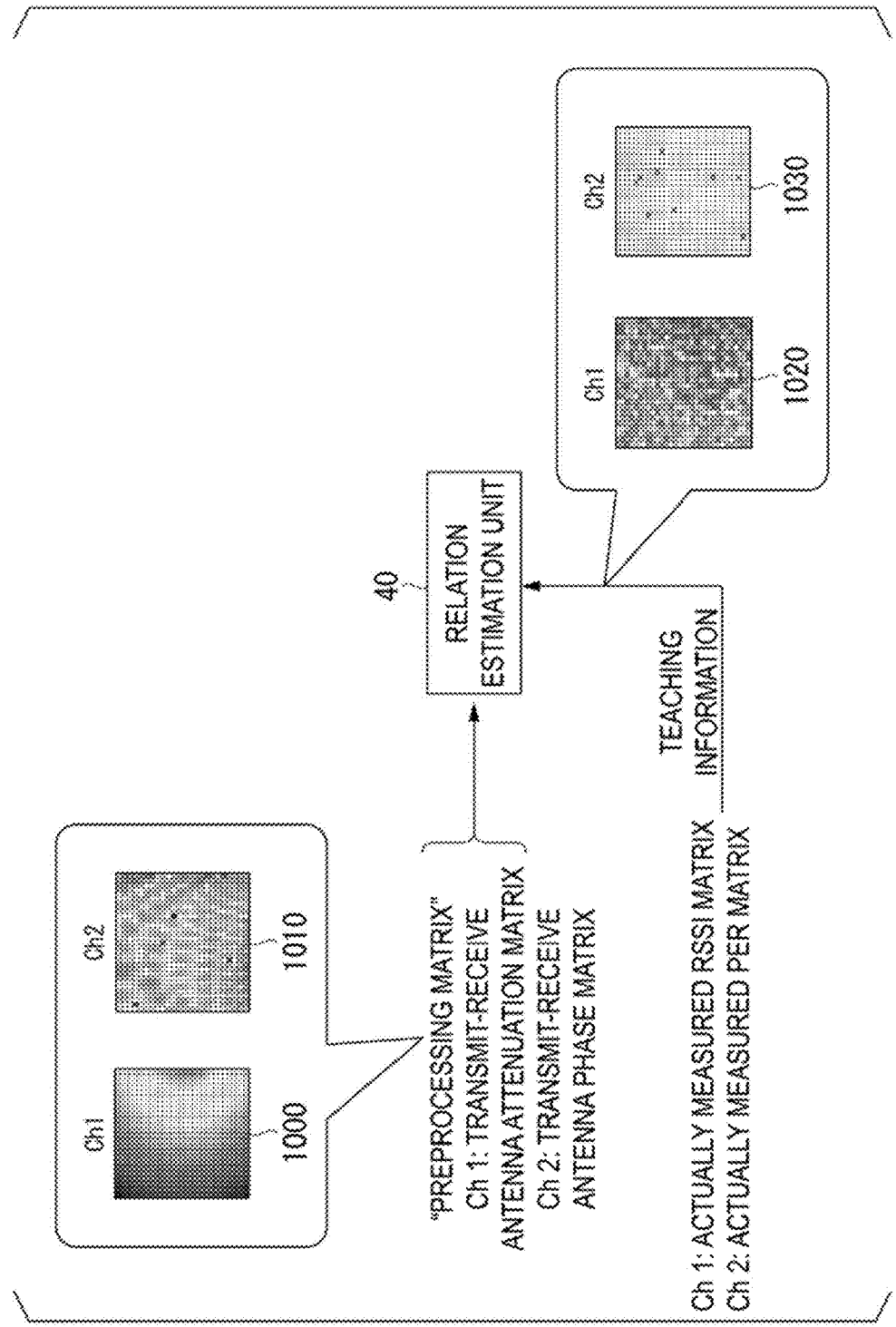
FIG. 20 is a schematic diagram of learning processing performed by the relation estimation unit according to the first embodiment.

The relation estimation unit 40 acquires the transmit-receive antenna attenuation matrices and the transmit-receive antenna phase matrices, and starts learning processing according to a machine learning method as illustrated in FIG. 20, by using the teaching information, i.e., the actually measured RSSI matrices and the actually measured PER matrices, that has been acquired in advance.

Note that, in FIG. 20, a heat map with a reference sign 1020 is a heat map for the actually measured RSSI matrix, and its information is represented in colors according to the reception strength values (RSSI). A heat map with a reference sign 1030 is an example of a heat map for the actually measured PER matrix, and information is represented in colors according to values of PER. Note that uncolored cells of the heat map for the actually measured PER matrix indicate that the PER for the radio waves received by a receive antenna installed in each of those cells is "0", i.e., the error rate is 0%.

First, the input layer 401 of the neural network unit 400 of the relation estimation unit 40 acquires the transmit-receive antenna attenuation matrices and the transmit-receive antenna phase matrices, and outputs the matrices to the intermediate layer 402. Each of the convolution layers 402-C1 to C6 of the intermediate layer 402 performs convolution operation on the transmit-receive antenna attenuation matrices and the transmit-receive antenna phase matrices by using the weight coefficients stored in the relation information storage unit 407.

The convolution layers 402-C1 to C5 output results of the convolution operation respectively to the Relu units 402-R1 to R5 on their corresponding next stage. The Relu units 402-R1 to R5 apply a Relu function to such an input value, and output an output value obtained through application of the Relu function respectively to the convolution layers 402-C2 to C6.

The convolution layer 402-C6 outputs results of the convolution operation to the output layer 403, and the output layer 403 outputs estimated RSSI matrices as Ch 1 and outputs estimated PER matrices as Ch 2 (Step Sa5).

The loss function calculation unit 410 of the loss function calculation and determination unit 405 calculates errors between the estimated RSSI matrices output by the output layer 403 and the actually measured RSSI matrices and errors between the estimated PER matrices output by the output layer 403 and the actually measured PER matrices given as the teaching information as a loss value by using a predetermined loss function.

The determination unit 411 of the loss function calculation and determination unit 405 determines whether or not the loss value is less than a threshold for the loss value or whether or not the iteration count parameter "n" is equal to a predetermined iteration count upper limit "N", to thereby determine whether or not to continue the learning processing (Step Sa6).

When the loss value is less than the threshold for the loss value or the iteration count parameter "n" is equal to the iteration count upper limit "N", the determination unit 411 determines not to continue the learning processing (Step Sa6, Yes), and ends the learning processing.

On the other hand, when the loss value is equal to or greater than the threshold for the loss value or the iteration count parameter "n" is not equal to the iteration count upper limit "N", the determination unit 411 determines to continue the learning processing (Step Sa6. No). The determination unit 411 adds 1 to the iteration count parameter "n", and outputs the loss value to the load update unit 406.

The load update unit 406 calculates new weight coefficients by using the weight coefficients stored in the relation information storage unit 407 and the loss value, and replaces the weight coefficients stored in the relation information storage unit 407 with the calculated new weight coefficients to update the weight coefficients (Step Sa7). After updating the weight coefficients, the load update unit 406 outputs data selection command information to the information selection unit 20.

When the information selection unit 20 receives the data selection command information, the information selection unit 20 performs the processing of Step Sa2 again. In other words, the information selection unit 20 selects a piece of transmit antenna coordinate information for learning to be applied to the next learning processing, and reads the selected piece of transmit antenna coordinate information for learning, the receive antenna coordinate information set, and the layout information, and outputs the read pieces of information to the pre-processing unit 30. The information selection unit 20 reads teaching information that corresponds to the selected piece of transmit antenna coordinate information for learning from the information storage unit 10, and outputs the read teaching information to the relation estimation unit 40.

In this manner, the learning processing is repeated. When the learning processing ends, the relation information storage unit 407 stores learned weight coefficients calculated by the load update unit 406, i.e., relation information indicating relation between the input information and the teaching information.

Figure 21:
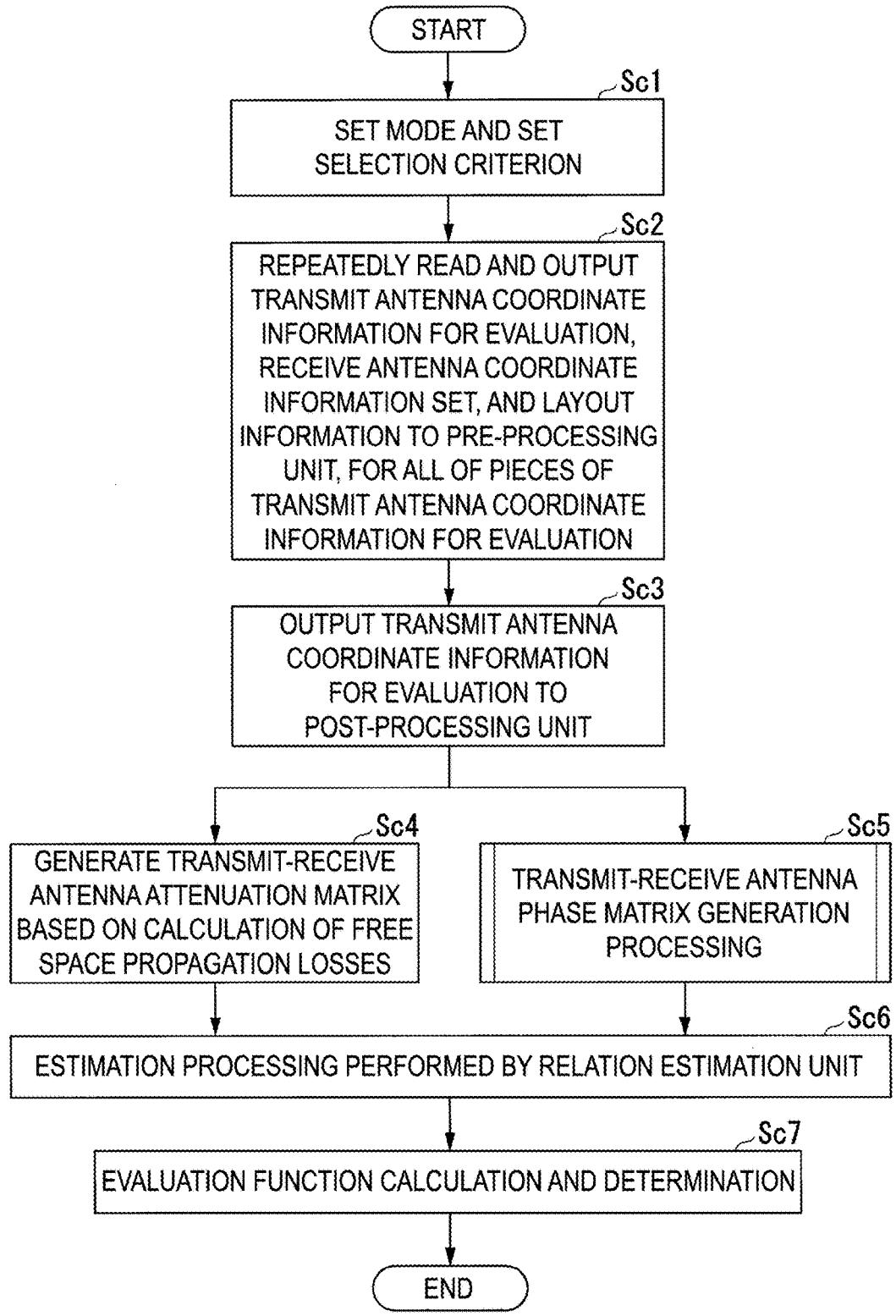
FIG. 21 is a flowchart illustrating a sequence of operations of estimation processing performed by the radio wave environment estimation apparatus according to the first embodiment.

Estimation Processing Performed by Radio Wave Environment Estimation Apparatus According to First Embodiment Next, with reference to FIG. 21 to FIG. 24, a sequence of operations of estimation processing performed by the radio wave environment estimation apparatus 1 according to the first embodiment will be described. FIG. 21 is a flowchart illustrating a sequence of operations of estimation processing performed by the radio wave environment estimation apparatus 1.

Mode specification information indicating an estimation mode and selection criterion indication information are given from the outside. When the switch 404 of the relation estimation unit 40 is given mode specification information indicating an estimation mode from the outside, the switch 404 performs switching so that an output terminal of the output layer 403 is connected to a terminal connected to the post-processing unit 50.

In accordance with the selection criterion indication information, the switch 500 of the post-processing unit 50 performs switching so that an input terminal of the switch 500 is connected to an output terminal connected to any one of the evaluation function calculation units 501-1 to N according to the selection criterion indication information.

Here, for example, a selection criterion indicated by the selection criterion indication information is a selection criterion that "a position of an AP that may maximize received power of an IoT device having the lowest received power among a plurality of IoT devices including a receive antenna is selected as the optimal AP installation position". The evaluation function calculation unit 501-1 is associated with the selection criterion. Thus, in accordance with the selection criterion indication information, the switch 500 performs switching so that the input terminal is connected to an output terminal connected to the evaluation function calculation unit 501-1 (Step Sc1).

In response to reception of the mode specification information indicating an estimation mode, the information selection unit 20 reads all of the pieces of transmit antenna coordinate information for evaluation stored in the information storage unit 10. The information selection unit 20 reads the receive antenna coordinate information set and the layout information stored in the information storage unit 10.

The information selection unit 20 selects one of the read pieces of transmit antenna coordinate information for evaluation at a time, and outputs the selected piece of transmit antenna coordinate information for evaluation, the receive antenna coordinate information set, and the layout information to the pre-processing unit 30. The information selection unit 20 repeatedly performs such selection and output for all of the pieces of transmit antenna coordinate information for evaluation (Step Sc2). The information selection unit 20 also outputs the pieces of transmit antenna coordinate information for evaluation to the post-processing unit 50 in the order of the selection (Step Sc3).

Figure 22:
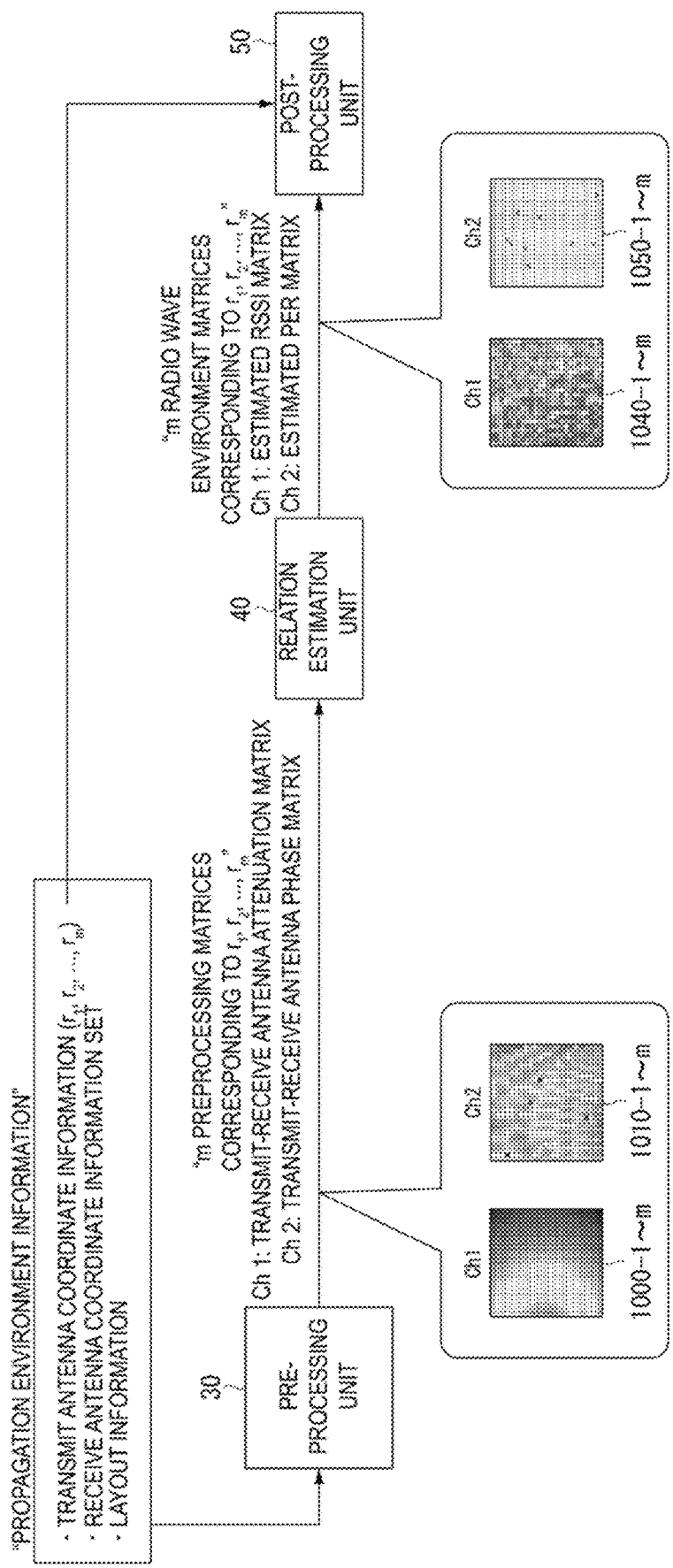
FIG. 22 is a schematic diagram of estimation processing performed by the pre-processing unit, the relation estimation unit, and the post-processing unit according to the first embodiment.

The processing of Step Sc2 is performed as follows: for example, if the information storage unit 10 stores m pieces of transmit antenna coordinate information for evaluation numbered from $r_l$ to $r_m$ in advance as illustrated in FIG. 22, the information selection unit 20 repeatedly outputs a piece of transmit antenna coordinate information for evaluation, the receive antenna coordinate information set, and the layout information to the pre-processing unit 30 m times, for each of the m pieces of transmit antenna coordinate information for evaluation $r_l$ to $r_m$. The information selection unit 20 also outputs the read pieces of transmit antenna coordinate information for evaluation $r_l$ to $r_m$ to the post-processing unit 50.

In Step Sc4 and Step Sc5, processing the same as that of Step Sa3 and Step Sa4 illustrated in FIG. 7 is performed for the pieces of transmit antenna coordinate information for evaluation, the receive antenna coordinate information set, and the layout information by the pre-processing unit 30. In this manner, as illustrated in FIG. 22, the pre-processing unit 30 generates m preprocessing matrices corresponding to the m pieces of transmit antenna coordinate information for evaluation numbered from $r_l$ to $r_m$. i.e., m transmit-receive antenna attenuation matrices and m transmit-receive antenna phase matrices, and outputs the generated matrices to the relation estimation unit 40.

Figure 23:
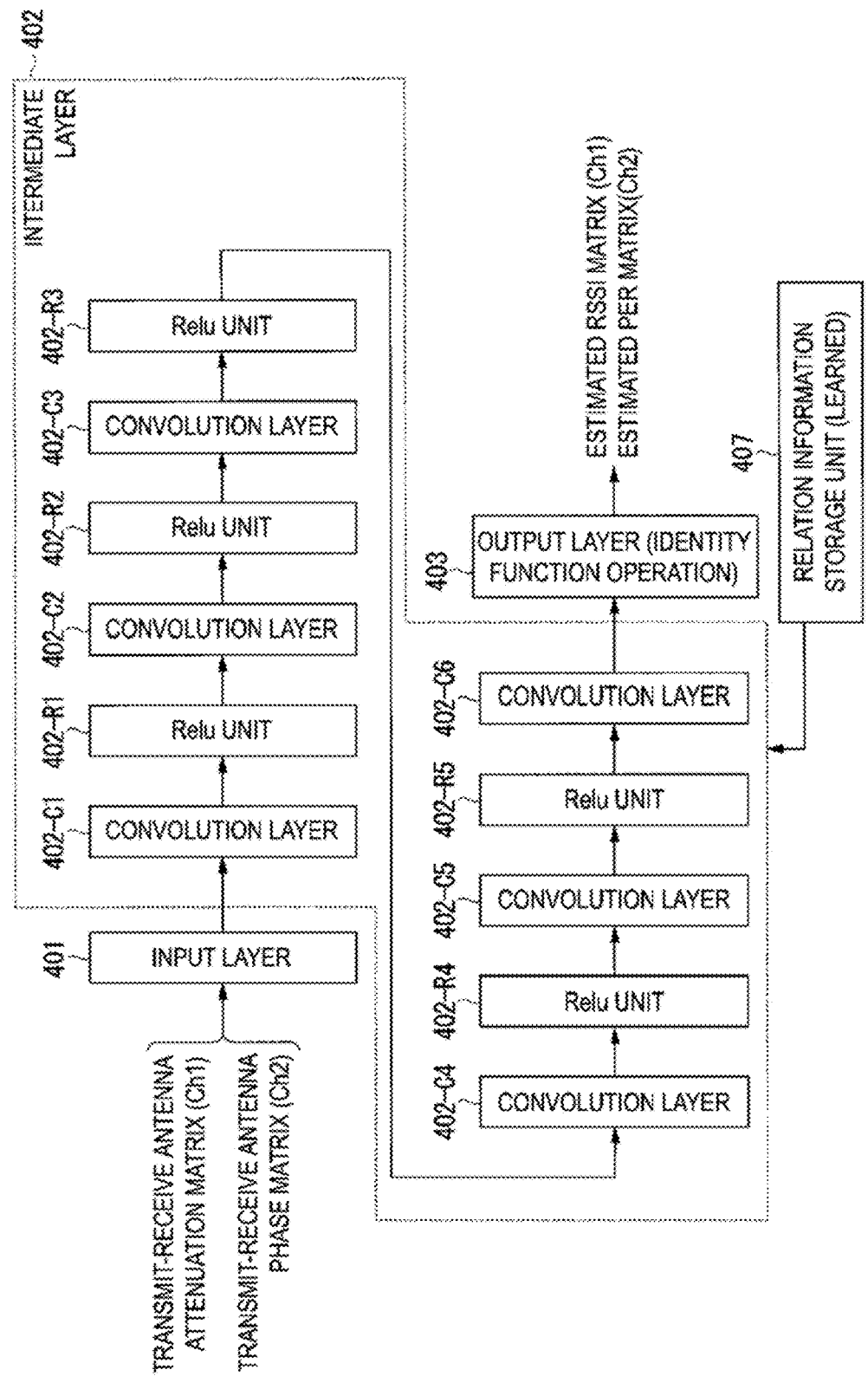
FIG. 23 is a block diagram (No. 3) illustrating a configuration of the relation estimation unit according to the first embodiment.

When the switch 404 switches its connection target according to the mode specification information indicating an estimation mode, the configuration of the relation estimation unit 40 has an internal configuration as illustrated in FIG. 23. The relation estimation unit 40 performs estimation processing of estimating m radio wave environment matrices, based on the m preprocessing matrices. In other words, the input layer 401 of the relation estimation unit 40 repeatedly acquires the transmit-receive antenna attenuation matrices output by the pre-processing unit 30 as input information for Ch 1 and the transmit-receive antenna phase matrices as input information for Ch 2 m times, and outputs the acquired pieces of input information to the intermediate layer 402.

Each of the convolution layers 402-C1 to C6 of the intermediate layer 402 performs convolution operation on the transmit-receive antenna attenuation matrices and the transmit-receive antenna phase matrices by using the learned weight coefficients stored in the relation information storage unit 407.

The convolution layers 402-C1 to C5 output results of the convolution operation respectively to the Relu units 402-R1 to R5 on their corresponding next stage. The Relu units 402-R1 to R5 apply a Relu function to such an input value, and output an output value obtained through application of the Relu function respectively to the convolution layers 402-C2 to C6.

The convolution layer 402-C6 outputs results of the convolution operation to the output layer 403, and the output layer 403 outputs estimated RSSI matrices as Ch 1 and outputs estimated PER matrices as Ch 2. The relation estimation unit 40 generates m estimated radio wave environment matrices corresponding to the m preprocessing matrices, i.e., m estimated RSSI matrices and m estimated PER matrices, and outputs the generated matrices to the post-processing unit 50 (Step Sc6).

Figure 24:
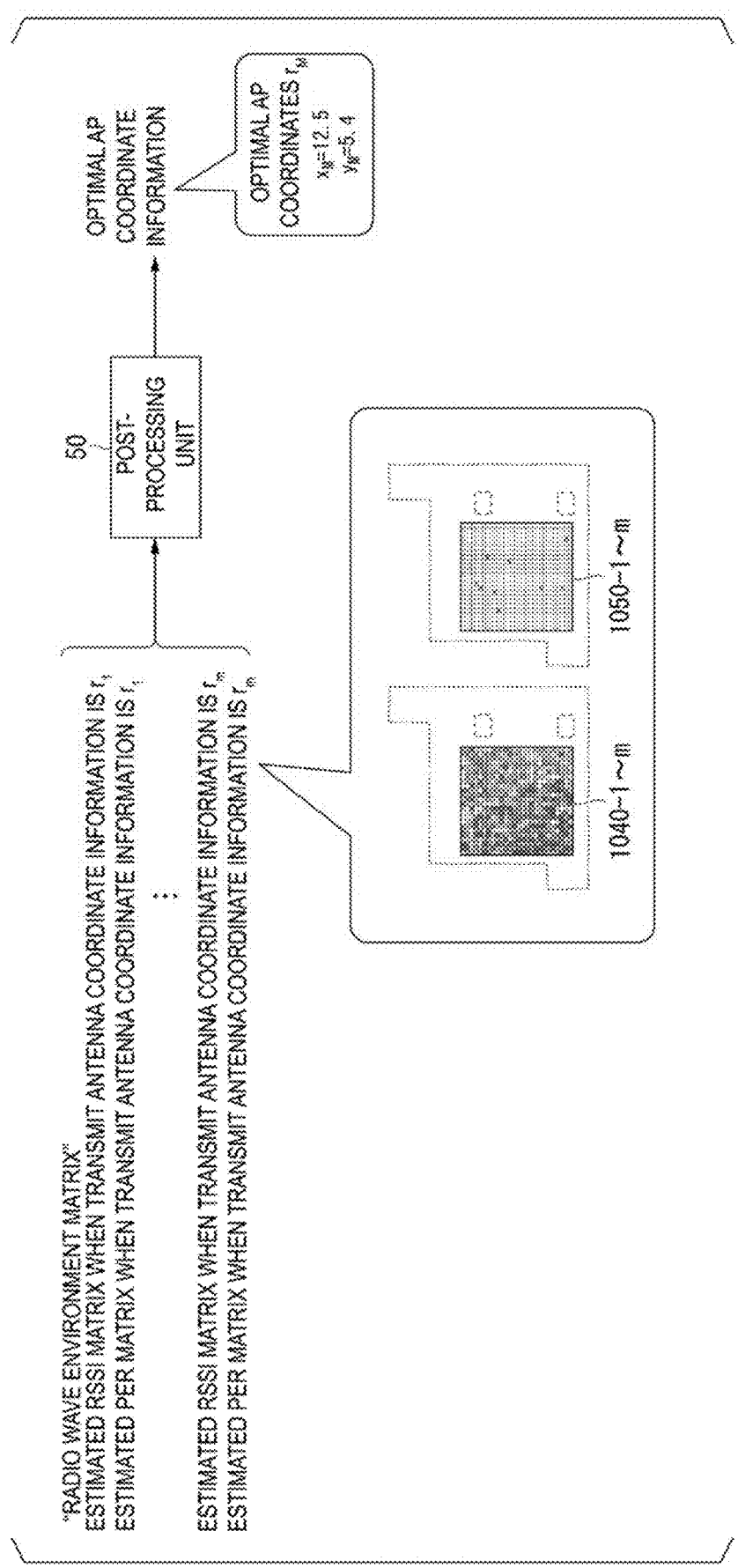
FIG. 24 is a schematic diagram of processing performed by the post-processing unit according to the first embodiment.

As illustrated in FIG. 24, the evaluation function calculation unit 501-1, which is selected according to the selection criterion indication information given from the outside, acquires the estimated RSSI matrices and the estimated PER matrices corresponding to the pieces of transmit antenna coordinate information for evaluation $r_l$ to $r_m$.

The selection criterion indicated by the selection criterion indication information is, as described above, a selection criterion that a position of an AP that may maximize received power of an IoT device having the lowest received power among a plurality of IoT devices including a receive antenna is selected as the optimal AP installation position. Thus, for example, the evaluation function calculation unit 501-1 employs an evaluation function for calculating received power values based on the reception strength values (RSSIs) being the elements of each estimated RSSI matrix.

The evaluation function calculation unit 501-1 applies the evaluation function and calculates a received power value of each piece of receive antenna coordinate information, based on a corresponding estimated RSSI matrix, as an evaluation value. Then, the evaluation function calculation unit 501-1 associates the calculated received power value of each piece of receive antenna coordinate information with a corresponding piece of transmit antenna coordinate information for evaluation. After the evaluation function calculation unit 501-1 applies the evaluation function to all of the estimated RSSI matrices corresponding to the plurality of pieces of transmit antenna coordinate information for evaluation, evaluation values corresponding to respective pieces of receive antenna coordinate information can be obtained for every single piece of transmit antenna coordinate information for evaluation.

The evaluation function calculation unit 501-1 detects a piece of receive antenna coordinate information having the lowest received power value. The evaluation function calculation unit 501-1 detects apiece of transmit antenna coordinate information for evaluation, with which the highest received power value is indicated among the received power values corresponding to the detected piece of receive antenna coordinate information. The evaluation function calculation unit 501-1 outputs the detected piece of transmit antenna coordinate information to the output unit 502. The output unit 502 acquires the piece of transmit antenna coordinate information output by the evaluation function calculation unit 501-1, and outputs the acquired piece of transmit antenna coordinate information as optimal AP coordinate information indicating an optimal transmit antenna installation position (Step Sc7).

Note that, when a selection criterion that "a position of an AP that may minimize a PER of an IoT device having the highest PER, i.e., an IoT device having the highest probability of occurrence of packet errors, among a plurality of IoT devices including a receive antenna is selected as the optimal AP installation position" is given as the selection criterion indicated by the selection criterion indication information, the processing of Step Sc7 is as follows.

For example, the evaluation function calculation unit 501-1 employs an evaluation function for reading a PER of each piece of receive antenna coordinate information included in each estimated PER matrix as an evaluation value. The evaluation function calculation unit 501-1 applies the evaluation function and reads a PER of each piece of receive antenna coordinate information from each estimated PER matrix as an evaluation value, and associates the read evaluation value with a corresponding piece of transmit antenna coordinate information for evaluation. After the evaluation function calculation unit 501-1 applies the evaluation function to all of the estimated PER matrices corresponding to the plurality of pieces of transmit antenna coordinate information for evaluation, evaluation values corresponding to respective pieces of receive antenna coordinate information can be obtained for every single piece of transmit antenna coordinate information for evaluation.

The evaluation function calculation unit 501-1 detects a piece of receive antenna coordinate information having the highest PER.

The evaluation function calculation unit 501-1 detects the lowest PER from among PERs corresponding to the detected piece of receive antenna coordinate information, and detects a piece of transmit antenna coordinate information for evaluation associated with the detected lowest PER. The evaluation function calculation unit 501-1 outputs the detected piece of transmit antenna coordinate information to the output unit 502. The output unit 502 acquires the piece of transmit antenna coordinate information output by the evaluation function calculation unit 501-1, and outputs the acquired piece of transmit antenna coordinate information as optimal AP coordinate information indicating an optimal transmit antenna installation position.

Figure 25:
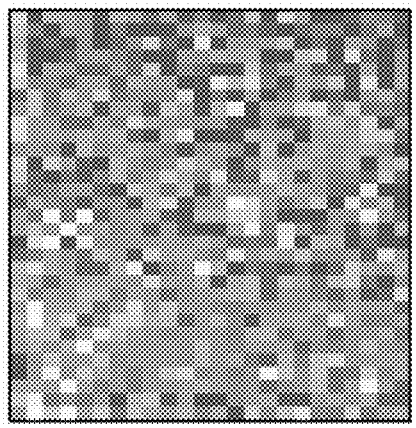
FIGS. 25A and 25B are each a diagram illustrating a heat map of an RSSI matrix based on simulation results and actual measurement results, respectively, obtained by the radio wave environment estimation apparatus according to the first embodiment.
Figure 25:
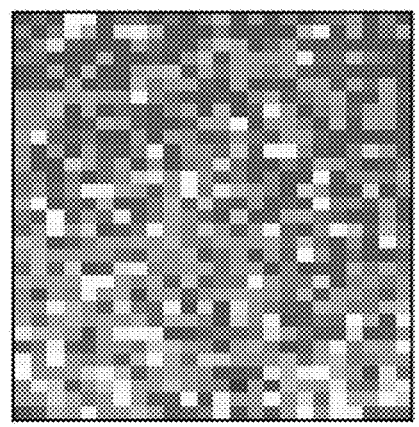

Regarding FIGS. 25A and 25B. FIG. 25A is a diagram illustrating a heat map of an estimated RSSI matrix based on simulation results, and FIG. 25B is a diagram illustrating a heat map of an actually measured RSSI matrix. The condition of the simulation is as follows.

Learning processing was performed by selecting nine different pieces of transmit antenna coordinate information for learning, and using 900 transmit-receive antenna attenuation matrices and transmit-receive antenna phase matrices, which are generated by transmitting 100 packets from each of the nine selected pieces of transmit antenna coordinate information for learning, as teaching information. As the transmit antenna coordinate information for evaluation, coordinate information different from that for the transmit antenna coordinate information for learning was given. The absolute value of a difference between the heat maps illustrated in FIGS. 25A and 25B is an error within 4.5 dB, which shows that satisfactory estimation can be performed by the radio wave environment estimation apparatus 1 according to the first embodiment.

Note that, in the configuration according to the first embodiment, the phase calculation unit 302 generates the transmit-receive antenna phase matrices in consideration of only one reflection. However, for example, the phase calculation unit 302 may generate the transmit-receive antenna phase matrices in consideration of two reflections as illustrated in FIG. 26B.

For example, when two reflections are considered, the phase calculation unit 302 calculates the synthetic reception strength value as follows. Firstly, the synthetic reception strength value is calculated only in consideration of one reflection illustrated in FIG. 26A. For example, radio waves reaching the receive antenna coordinates 3000-$k$ through each of reflection points 4000-k1, 4000-k2, and 4000-k3 have reception strength values of $\beta_1$, $\beta_2$, and $\beta_3$ due to free space propagation losses, respectively, and phase rotation amounts of $\Psi_1$, $\Psi_2$, and $\Psi_3$, respectively. In this case, a synthetic reception strength value $\sigma_1$ is expressed as the following equation (5).

$$\sigma_1 = \beta_1 \exp(j\Psi_1) + \beta_2 \exp(j\Psi_2) + \beta_3 \exp(j\Psi_3) \quad (5)$$

Figure 26:
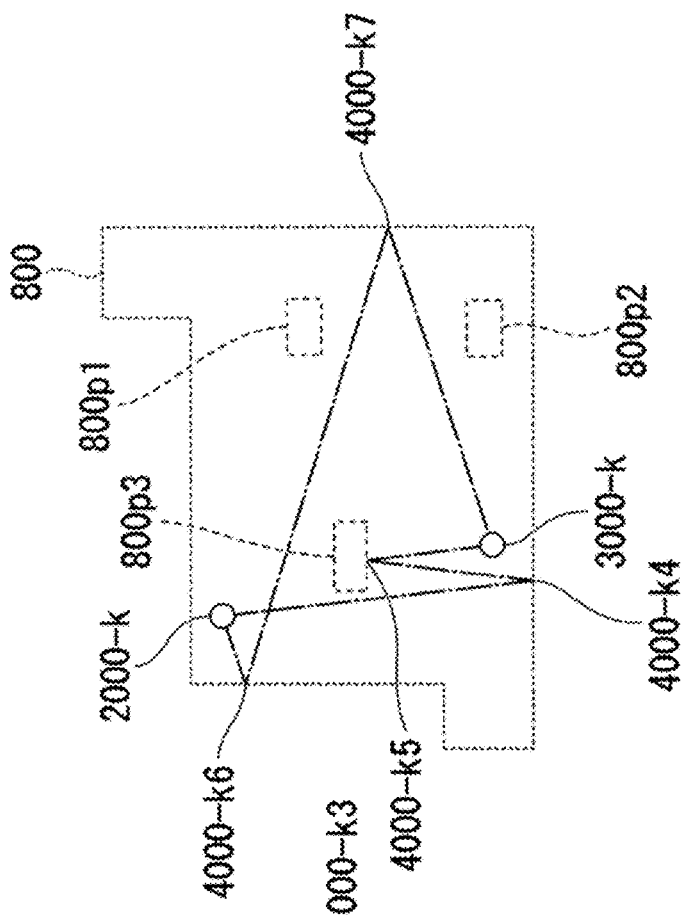
FIGS. 26A and 26B are each an explanatory diagram (No. 1) of another processing example performed by the phase calculation unit of the pre-processing unit according to the first embodiment.
Figure 26:
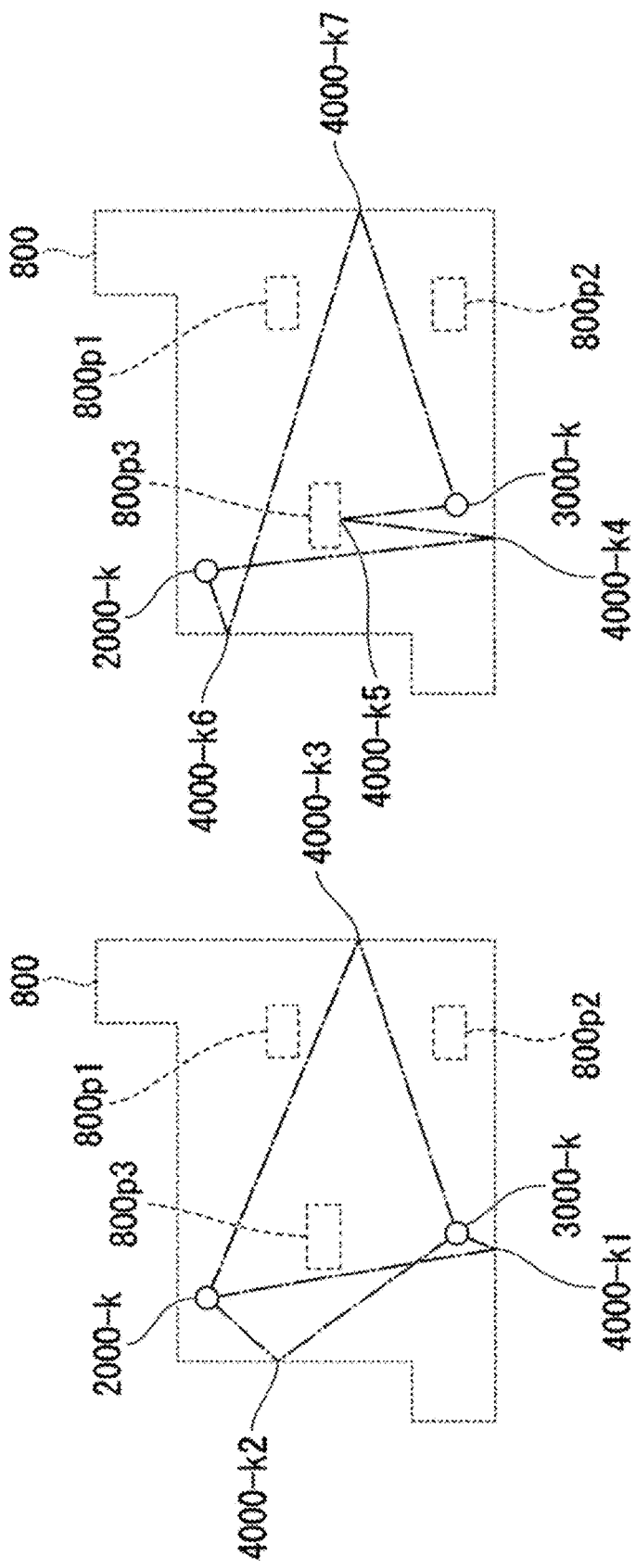

Next, the synthetic reception strength value is calculated only in consideration of two reflections illustrated in FIG. 26B. For example, radio waves reaching the receive antenna coordinates 3000-$k$ through each of reflection points 4000-k4 and 4000-k5 and reflection points of 4000-k6 and 4000-k7 have reception strength values of $\beta_4$ and $\beta_5$ due to free space propagation losses, respectively, and phase rotation amounts of $\Psi_4$ and $\Psi_5$, respectively. In this case, a synthetic reception strength value $\sigma_2$ is expressed as the following equation (6).

$$\sigma_2 = \beta_4 \exp(j\Psi_4) + \beta_5 \exp(j\Psi_5) \quad (6)$$

Therefore, the phase calculation unit 302 calculates the synthetic reception strength value $\sigma$ in consideration of both of one reflection and two reflections according to the following equation (7).

$$\sigma = \sigma_1 + \sigma_2 = \beta_1 \exp(j\Psi_1) + \beta_2 \exp(j\Psi_2) + \beta_3 \exp(j\Psi_3) + \beta_4 \exp(j\Psi_4) + \beta_5 \exp(j\Psi_5) \quad (7)$$

Multipath includes direct waves and indirect waves. The indirect waves include diffracted waves and transmitted waves, as well as the reflected waves described above. In view of this, diffracted waves as illustrated in FIG. 27 and transmitted waves illustrated in FIG. 28 may apply as elements of the transmit-receive antenna phase matrix.

Figure 27:
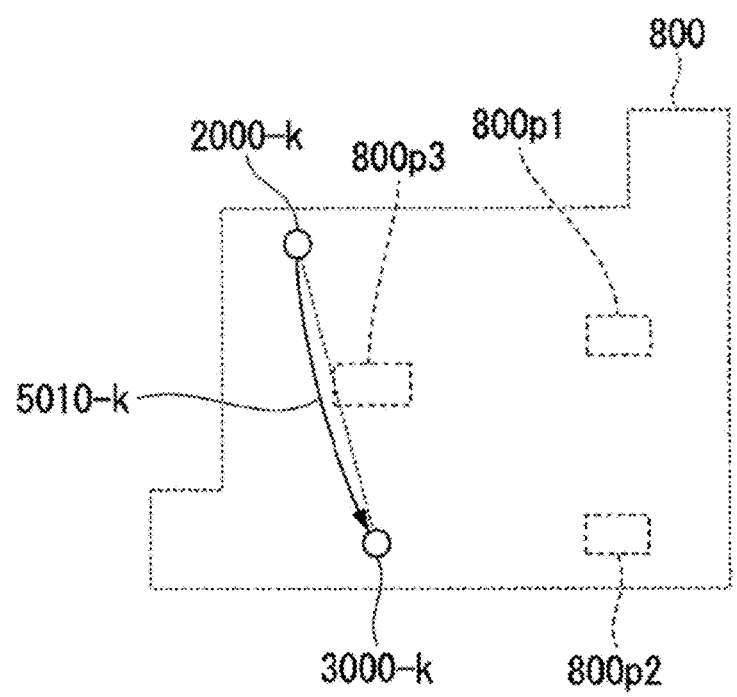
FIG. 27 is an explanatory diagram (No. 2) of another processing example performed by the phase calculation unit of the pre-processing unit according to the first embodiment.

In a case of the diffracted waves illustrated in FIG. 27, a distance from a position of transmit antenna coordinates 2000-$k$ to a position of receive antenna coordinates 3000-$k$ is not represented as a straight line but as a curved line. Thus, the phase calculation unit 302 calculates a free space propagation loss amount by using the length of the curved line as a propagation distance, and calculates a reception strength value at the receive antenna coordinates 3000-$k$ by using the calculated free space propagation loss amount.

Figure 28:
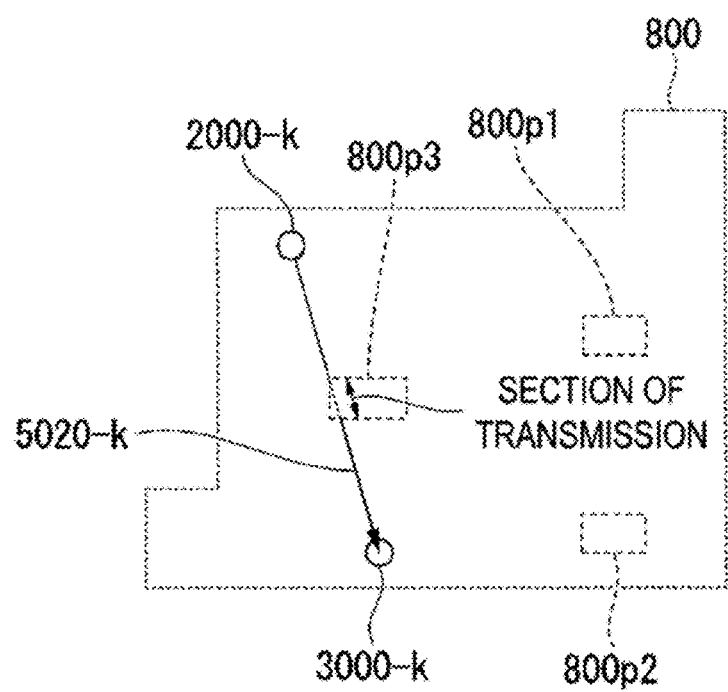
FIG. 28 is an explanatory diagram (No. 3) of another processing example performed by the phase calculation unit of the pre-processing unit according to the first embodiment.

In a case of the transmitted waves illustrated in FIG. 28, there is an obstruction indicated by a reference sign 800$p3$ between a position of transmit antenna coordinates 2000-$k$ and a position of receive antenna coordinates 3000-$k$. Thus, the phase calculation unit 302 calculates a free space propagation loss amount by using a direct distance from the position of the transmit antenna coordinates 2000-$k$ to the position of the receive antenna coordinates 3000-$k$, and also calculates an attenuation amount due to transmission through the obstruction indicated by the reference sign 800$p3$. The phase calculation unit 302 calculates a reception strength value at the receive antenna coordinates 3000-$k$ by using the calculated free space propagation loss amount and attenuation amount.

Regarding an element of the transmit-receive antenna phase matrix, a synthetic reception strength value obtained by freely combining the above reflected wave with one reflection, reflected wave with two reflections, diffracted wave, or transmitted wave may be used as an element. A synthetic reception strength value obtained by freely combining the direct wave and the above reflected wave with one reflection, reflected wave with two reflections, diffracted wave, or transmitted wave may be used as an element of the transmit-receive antenna phase matrix.

The above configuration according to the first embodiment employs processing in which double loop processing in the transmit-receive antenna phase matrix generation processing performed by the phase calculation unit 302 illustrated in FIG. 8, i.e., processing repeated for a plurality of mathematical expressions illustrated in Loops Lb2$s$ to Lb2$e$, is performed in the processing repeated for all of the pieces of receive antenna coordinate information illustrated in Loops Lb1s to Lb1e. The processing is not limited to the above processing, and the processing of Step Sb3 may be performed after completion of the double loop processing, with the relationship between Loops Lb2s to Lb2e and Loops Lb1s to Lb1e being inversed.

In the above configuration according to the first embodiment, the actually measured RSSI matrices and the actually measured PER matrices are given to the relation estimation unit 40 as teaching information to cause the relation estimation unit 40 to perform learning processing. However, the configuration of the present invention is not limited to that of the first embodiment. The teaching information may be any sort of information as long as the information indicates a reception state of radio waves that can be actually measured at the position of a receive antenna. As the teaching information, any one or all of the following may be given, instead of each actually measured RSSI matrix and each actually measured PER matrix: an actually measured throughput matrix whose elements are values of actually measured throughput, an actually measured bit error ratio (BER) matrix whose elements are values of actually measured BERs, information of a delay profile, an actually measured signal-to-noise ratio (SNR) matrix whose elements are values of actually measured SNRs, an actually measured signal to interference plus noise ratio (SINR) matrix whose elements are values of actually measured SINRs, an actually measured carrier to noise ratio (CNR) matrix whose elements are values of actually measured CNRs, and an actually measured carrier to interference and noise ratio (CINR) matrix whose elements are values of actually measured CINRs. In such a case, information including a free combination of two from below may be used as the teaching information: the actually measured RSSI matrix, the actually measured PER matrix, the actually measured throughput matrix, the actually measured BER matrix, the delay profile, the actually measured SNR matrix, the actually measured SINR matrix, the actually measured CNR matrix, and the actually measured CINR matrix. Alternatively, information including three of more from below may be used as the teaching information: the actually measured RSSI matrix, the actually measured PER matrix, the actually measured throughput matrix, the actually measured BER matrix, the delay profile, the actually measured SNR matrix, the actually measured SINR matrix, the actually measured CNR matrix, and the actually measured CINR matrix. Alternatively, any one from below may be used as the teaching information: the actually measured RSSI matrix, the actually measured PER matrix, the actually measured throughput matrix, the actually measured BER matrix, the delay profile, the actually measured SNR matrix, the actually measured SINR matrix, the actually measured CNR matrix, and the actually measured CINR matrix. In the estimation mode, the relation estimation unit 40 outputs matrices corresponding to the matrices given as the teaching information to the post-processing unit 50 as estimation results. Due to this configuration, the post-processing unit 50 needs to include the evaluation function calculation units 501-1 to N each employing an evaluation function capable of calculating evaluation values according to the estimation results output by the relation estimation unit 40.

In the above configuration according to the first embodiment, the transmit-receive antenna attenuation matrices and the transmit-receive antenna phase matrices are given to the relation estimation unit 40 as the input information to cause the relation estimation unit 40 to perform learning processing. However, the configuration of the present invention is not limited to that of the first embodiment. Only the transmit-receive antenna phase matrices may be given as the input information. Regarding the teaching information given in this case as well, information to be given is not limited to the actually measured RSSI matrix and the actually measured PER matrix of the first embodiment. As described above, information including a free combination of two from below may be used as the teaching information: the actually measured RSSI matrix, the actually measured PER matrix, the actually measured throughput matrix, the actually measured BER matrix, the delay profile, the actually measured SNR matrix, the actually measured SINR matrix, the actually measured CNR matrix, and the actually measured CINR matrix. Alternatively, information including three of more from below may be used as the teaching information: the actually measured RSSI matrix, the actually measured PER matrix, the actually measured throughput matrix, the actually measured BER matrix, the delay profile, the actually measured SNR matrix, the actually measured SINR matrix, the actually measured CNR matrix, and the actually measured CINR matrix. Alternatively, any one from below may be used as the teaching information: the actually measured RSSI matrix, the actually measured PER matrix, the actually measured throughput matrix, the actually measured BER matrix, the delay profile, the actually measured SNR matrix, the actually measured SINR matrix, the actually measured CNR matrix, and the actually measured CINR matrix.

In the above configuration according to the first embodiment, the neural network unit 400 of the relation estimation unit 40 includes a three-dimensional neural network. However, the configuration of the present invention is not limited to that of the first embodiment. For example, when only the transmit-receive antenna phase matrix is given as the input information as described above, a two-dimensional neural network may be used. Further, it is also possible to use such a neural network unit 400 including a one-dimensional neural network or a two-dimensional neural network, which are obtained by forming the transmit-receive antenna attenuation matrix and the transmit-receive antenna phase matrix into two-dimensional information or into one-dimensional information.

In the above configuration according to the first embodiment, the intermediate layer 402 of the neural network unit 400 of the relation estimation unit 40 includes the Relu units 402-R1 to R5 each employing a Relu function. Instead of the Relu units 402-R1 to R5, function units that each perform computation using another activation function, such as a step function, linear combination, a sigmoid function, a softsign function, and a softplus function, may be included.

In the above configuration according to the first embodiment, the area of the quadrilateral 900 illustrated in FIG. 2 is defined as a region where a receive antenna is to be installed, for example. However, the configuration of the present invention is not limited to that of the first embodiment. Such a region is not limited to a quadrilateral, and may have any shape. Receive antenna coordinates that can be used for the learning processing in the relation estimation unit 40 are limited to receive antenna coordinates at which actually measured RSSIs and actually measured PERs can be given as the teaching information, and thus, only positions at which the RSSI and the PER can be actually measured may be defined as receive antenna coordinates.

In the above configuration according to the first embodiment, the relation estimation unit 40 is configured to generate information indicating relation between the transmit-receive antenna attenuation matrices and the transmit-receive antenna phase matrices as the input information and the actually measured RSSI matrices and the actually measured PER matrices as the teaching information by means of machine learning. However, the configuration of the present invention is not limited to that of the first embodiment. The relation information indicating relation between the input information and the teaching information may be generated according to a method other than machine learning, such as a deterministic algorithm.

In the above configuration according to the first embodiment, as the radio wave environment to be estimated, for example, two-dimensional plane represented by XY coordinates is assumed. However, a three-dimensional space represented by XYZ coordinates may be used. In the above configuration according to the first embodiment, the relation estimation unit 40 may be configured to estimate heat maps for strength of radio waves of a case where a transmit antenna is placed at any position, without processing of the post-processing unit 50. In such a configuration, the relation estimation unit 40 calculates information indicating a reception state of radio waves by using the transmit antenna coordinate information for evaluation and the generated relation information, and thereby estimates heat maps for strength of the radio waves.

According to the above configuration according to the first embodiment, in the radio wave environment estimation apparatus 1, the pre-processing unit 30 calculates the synthetic reception strength value obtained when indirect waves of radio waves caused due to an obstruction are synthesized, for each piece of receive antenna coordinate information in consideration of the phase of the indirect waves and a propagation distance, by using the following pieces of information: transmit antenna coordinate information indicating a position of a transmit antenna that transmits radio waves, receive antenna coordinate information indicating a position of a receive antenna that receives the radio waves, and layout information indicating a position at which an obstruction that interferes with propagation of the radio waves is located. The relation estimation unit 40 generates the relation information indicating relation between the input information and the teaching information, with synthetic reception strength values of respective pieces of receive antenna coordinate information corresponding to the transmit antenna coordinate information as the input information, and the following information as the teaching information: information indicating a reception state of the radio waves obtained when the radio waves output by the transmit antenna are actually measured at the position of the receive antenna. The relation estimation unit 40 calculates information indicating a reception state of the radio waves by using the transmit antenna coordinate information for evaluation and the generated relation information, and thereby estimates heat maps for strength of the radio waves. In this manner, heat maps can be estimated even when the transmit antenna is placed at any position. As a result, strength of radio waves can be estimated in consideration of influence from indirect waves with a certain calculation period of time, irrespective of the number of obstructions.

According to the above configuration according to the first embodiment, in the radio wave environment estimation apparatus 1, the pre-processing unit 30 calculates the synthetic reception strength value obtained when indirect waves of radio waves caused due to an obstruction are synthesized, for each piece of receive antenna coordinate information in consideration of the phase of the indirect waves and a propagation distance, by using the following pieces of information: transmit antenna coordinate information indicating a position of a transmit antenna that transmits radio waves, receive antenna coordinate information indicating a position of a receive antenna that receives the radio waves, and layout information indicating a position at which an obstruction that interferes with propagation of the radio waves is located. The relation estimation unit 40 generates the relation information indicating relation between the input information and the teaching information, with synthetic reception strength values of respective pieces of receive antenna coordinate information corresponding to the transmit antenna coordinate information as the input information, and the following information as the teaching information: information indicating a reception state of the radio waves obtained when the radio waves output by the transmit antenna are actually measured at the position of the receive antenna. The relation estimation unit 40 calculates the information indicating a reception state of the radio waves by using the transmit antenna coordinate information for evaluation and the generated relation information. The post-processing unit 50 evaluates the position of the transmit antenna for evaluation by using the information indicating the reception state of the radio waves. As a result, an optimal transmit antenna installation position can be estimated in consideration of influence from indirect waves with a certain calculation period of time, irrespective of the number of obstructions.

As described above, when an environment enters a multipath state due to generation of indirect waves caused by reflection or the like in propagation of radio waves, in-phase or reverse-phase synthesis is caused in the radio waves received by the receive antenna. Such synthesis causes the reception strength of the radio waves received by the receive antenna to change in an oscillatory manner rather than a monotonically attenuating manner.

In view of this, in the radio wave environment estimation apparatus 1 according to the first embodiment, to accurately estimate the reception strength of radio waves, estimation of a radio wave environment focusing on phase information of the radio waves is performed.

Even if only image information of a propagation environment is used as input information for machine learning, learning results cannot reflect constructive or destructive interference of the radio waves caused by the in-phase synthesis or the reverse-phase synthesis of the radio waves in a multipath environment, because phase information of the radio waves is not included. In view of this, in the radio wave environment estimation apparatus 1, the pre-processing unit 30 performs pre-processing of converting synthesis results of reception strength values of main indirect waves generated due to reflection or the like and phase rotation amounts into matrices and generating such matrices as transmit-receive antenna phase matrices. When the relation estimation unit 40 performs learning processing according to a machine learning method by using the transmit-receive antenna phase matrices generated by the pre-processing unit 30 as the input information and the information indicating a reception state of the radio waves actually measured at the position of the receive antenna as the teaching information, high-accuracy learning processing in consideration of phase information can be performed. When the indirect waves are reflected waves, the phase calculation unit 302 of the pre-processing unit 30 calculates a propagation distance of the reflected waves with a small amount of computation by using an elliptic function, achieving reduction in a computation period of time.

In the technique described in NPL 1, a real space as an estimation target of a radio wave environment is formed into one-dimensional information, and thus does not include a configuration of estimating a radio wave environment in consideration of spatial characteristic information.

In contrast, the neural network unit 400 of the relation estimation unit 40 of the radio wave environment estimation apparatus 1 includes a three-dimensional neural network, and is thus capable of acquiring input information including spatial characteristic information and performing learning processing including the spatial characteristic information.

In comparison with a one-dimensional neural network, two-dimensional and three-dimensional neural networks perform convolution operation a plurality of times in the learning processing and the estimation processing, and thus require a significant computation period of time unless appropriate pre-processing is performed on the input information. To address the issues, in the radio wave environment estimation apparatus 1, the pre-processing unit 30 performs pre-processing of extracting spatial characteristic information of radio waves, i.e., the transmit-receive antenna attenuation matrices and the transmit-receive antenna phase matrices. This contributes to reduction in the number of elements of the input information, thus achieving reduction in a computation period of time.

In terms of a computation period of time, with a ray tracing method of estimating a propagation environment, reflections and transmissions of all of the propagation paths caused by obstructions present in a target region are calculated as described above. Thus, the number of propagation paths is increased at an exponential rate according to the increased number of obstructions. This poses a problem that time required for calculation may be significantly prolonged depending on a structure of a building or the like. To address the issues, in the radio wave environment estimation apparatus 1, after learned weight coefficients are generated in the learning processing, the estimation processing can be performed with a certain period of time, irrespective of the number of obstructions. Further, in the radio wave environment estimation apparatus 1, computation is performed after characteristic information present in the propagation environment of the radio waves is extracted by the pre-processing unit 30, which enables estimation in a shorter period of time than that in ray tracing. In one example, in a case of a propagation environment where ray tracing software "XGtd" takes a few hours to perform estimation, the radio wave environment estimation apparatus 1 can perform processing in as less as a few minutes.

In the above configuration according to the first embodiment, an optimal transmit antenna installation position, i.e., an optimal AP installation position, is selected with a transmit antenna of an AP and a receive antenna of an IoT device being involved. In this case, propagation of radio waves in radio communication has symmetric property in transmission and reception. This means that, when radio waves are transmitted from an AP to an IoT device and a reception strength value of the radio waves received by the IoT device is low, a reception strength value of radio waves received by the AP when the radio waves are transmitted in reverse from the IoT device to the AP is also similarly low. Thus, because such relation is true vice versa, the radio wave environment estimation apparatus 1 may select an optimal transmit antenna installation position, i.e., an optimal IoT device installation position, with a transmit antenna of an IoT device and a receive antenna of an AP being involved.

Second Embodiment

Figure 29:
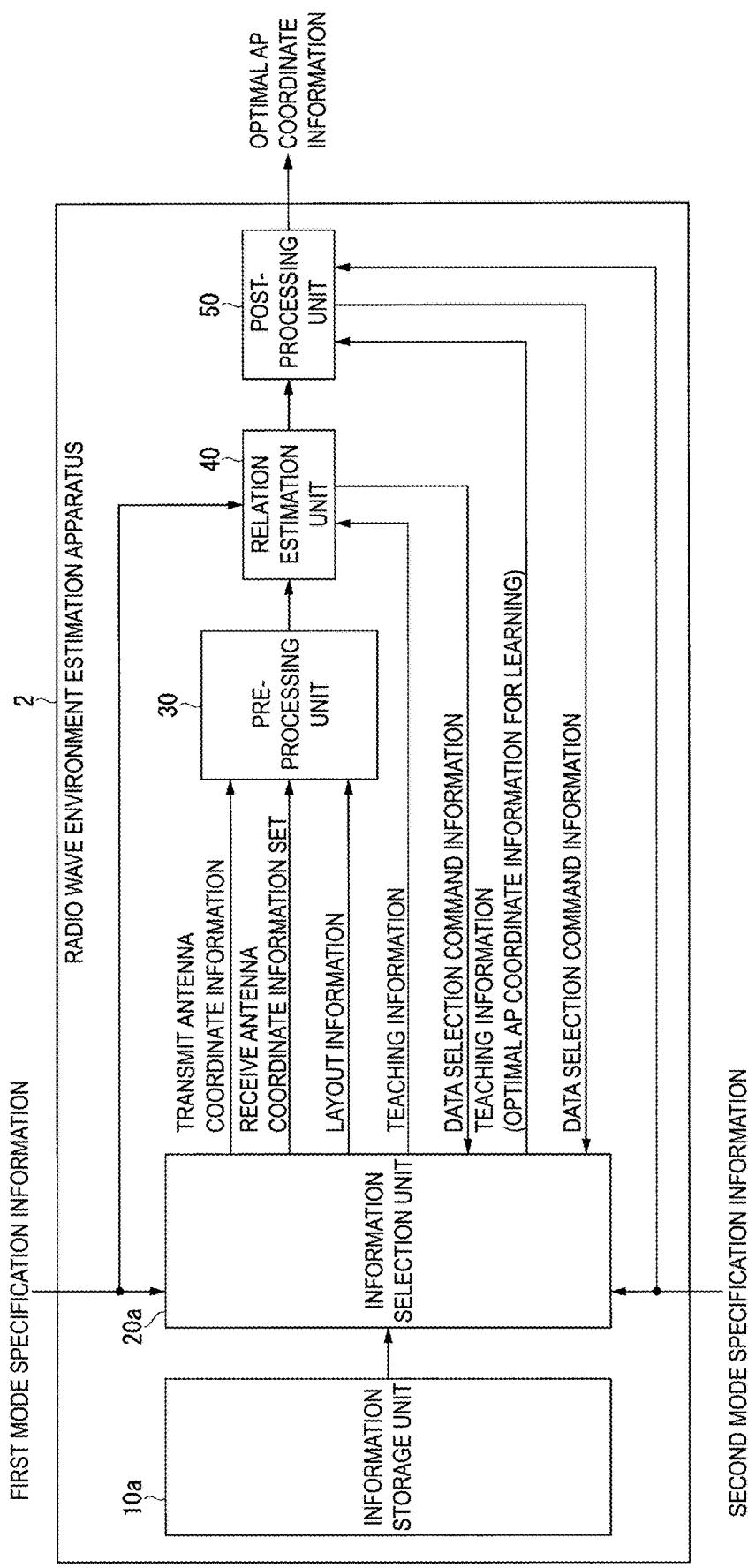
FIG. 29 is a block diagram illustrating a configuration of a radio wave environment estimation apparatus according to a second embodiment.

FIG. 29 is a block diagram illustrating a configuration of a radio wave environment estimation apparatus 2 according to a second embodiment.

The same components as those of the radio wave environment estimation apparatus 1 of the first embodiment are denoted by the same reference signs, and different components will be described below. The radio wave environment estimation apparatus 2 includes an information storage unit 10a, an information selection unit 20a, a pre-processing unit 30, a relation estimation unit 40, and a post-processing unit 50a.

The radio wave environment estimation apparatus 1 according to the first embodiment has a configuration that the evaluation function calculation units 501-1 to N calculate an optimal AP coordinate information by using a predetermined evaluation function and evaluation condition, based on estimated RSSI matrices and estimated PER matrices output by the relation estimation unit 40. In contrast, the radio wave environment estimation apparatus 2 according to the second embodiment includes a configuration of performing learning processing on relation between the estimated RSSI matrices and the estimated PER matrices, and the optimal AP coordinate information, according to a machine learning method.

To achieve the configuration, for example, the post-processing unit 50a includes an internal configuration similar to the internal configuration of the relation estimation unit 40 illustrated in FIG. 4. As the input information, the post-processing unit 50a is given estimated RSSI matrices and estimated PER matrices output by the relation estimation unit 40. As the teaching information, the post-processing unit 50a is given optimal AP coordinate information indicating a predetermined optimal transmit antenna installation position for learning, instead of the actually measured RSSI matrices and the actually measured PER matrices.

The optimal AP coordinate information for learning is selected as follows, for example. The pre-processing unit 30 generates transmit-receive antenna attenuation matrices and transmit-receive antenna phase matrices, based on pieces of transmit antenna coordinate information for learning, a receive antenna coordinate information set, and layout information. The relation estimation unit 40 generates estimated RSSI matrices and estimated PER matrices, based on the transmit-receive antenna attenuation matrices and the transmit-receive antenna phase matrices generated by the pre-processing unit 30.

Specifically, one estimated RSSI matrix and one estimated PER matrix are obtained for each piece of transmit antenna coordinate information for learning. Thus, based on a plurality of pieces of transmit antenna coordinate information for learning, a plurality of corresponding estimated RSSI matrices and a plurality of corresponding estimated PER matrices are obtained.

Any one selection criterion is selected among the selection criteria described in the first embodiment, and a piece of coordinate information to be an optimal transmit antenna installation position is detected in advance among the plurality of pieces of transmit antenna coordinate information for learning according to the selected selection criterion, based on actual measurement results, for example. The detected piece of transmit antenna coordinate information for learning is selected as the optimal AP coordinate information for learning. The information storage unit 10a stores the optimal AP coordinate information for learning selected as described above in advance, as well as the information stored in the information storage unit 10 of the first embodiment.

Processing of the radio wave environment estimation apparatus 2 is performed as follows. First mode specification information corresponds to the mode specification information of the first embodiment. First, first mode specification information indicating a learning mode is given to the information selection unit 20a and the relation estimation unit 40. In response to this, in a similar manner to the first embodiment, the relation estimation unit 40 starts learning processing of estimating relation between the transmit-receive antenna attenuation matrices and the transmit-receive antenna phase matrices, and the actually measured RSSI matrices and the actually measured PER matrices, according to a machine learning method.

After the learning processing of the relation estimation unit 40 ends, first mode specification information indicating an estimation mode is given to the information selection unit 20a and the relation estimation unit 40, and second mode specification information indicating a learning mode is given to the information selection unit 20a and the post-processing unit 50a.

Because the first mode specification information is an estimation mode and the second mode specification information is a learning mode, the information selection unit 20a outputs the transmit antenna coordinate information for learning, the receive antenna coordinate information set, and the layout information to the pre-processing unit 30. The information selection unit 20a reads the optimal AP coordinate information for learning from the information storage unit 10a, and outputs the read optimal AP coordinate information for learning to the post-processing unit 50a.

The pre-processing unit 30 generates transmit-receive antenna attenuation matrices and transmit-receive antenna phase matrices based on the transmit antenna coordinate information for learning, the receive antenna coordinate information set, and the layout information, and outputs the generated matrices to the relation estimation unit 40. The relation estimation unit 40 generates estimated RSSI matrices and estimated PER matrices based on the transmit-receive antenna attenuation matrices and the transmit-receive antenna phase matrices output by the pre-processing unit 30, and outputs the generated matrices to the post-processing unit 50a.

The post-processing unit 50a acquires the estimated RSSI matrices and the estimated PER matrices output by the relation estimation unit 40 as input information, and performs learning processing by using teaching information including the optimal AP coordinate information output by the information selection unit 20a, according to a machine learning method. In a case that the learning processing is repeated, data selection command information is output to the information selection unit 20a.

After the learning processing of the post-processing unit 50a ends, first mode specification information indicating an estimation mode is given to the information selection unit 20a and the relation estimation unit 40, and second mode specification information indicating an estimation mode is given to the information selection unit 20a and the post-processing unit 50a. Because both of the first mode specification information and the second mode specification information indicate an estimation mode, the information selection unit 20a outputs transmit antenna coordinate information for evaluation, the receive antenna coordinate information set, and the layout information to the pre-processing unit 30.

The pre-processing unit 30 generates transmit-receive antenna attenuation matrices and transmit-receive antenna phase matrices corresponding to the transmit antenna coordinate information for evaluation, based on the transmit antenna coordinate information for evaluation, the receive antenna coordinate information set, and the layout information, and outputs the generated matrices. As in Step Sc2 illustrated in FIG. 21 of the first embodiment, because there are a plurality of pieces of transmit antenna coordinate information for evaluation, the pre-processing unit 30 generates a plurality of transmit-receive antenna attenuation matrices and a plurality of transmit-receive antenna phase matrices corresponding to the plurality of pieces of transmit antenna coordinate information for evaluation, and outputs the generated matrices.

The relation estimation unit 40 generates a plurality of estimated RSSI matrices and a plurality of estimated PER matrices by applying learned weight coefficients obtained through the learning processing to the plurality of transmit-receive antenna attenuation matrices and the plurality of transmit-receive antenna phase matrices, and outputs the generated matrices. The post-processing unit 50a applies the learned weight coefficients, being relation information indicating relation between the input information and the teaching information obtained through the learning processing, to the plurality of estimated RSSI matrices and the plurality of estimated PER matrices, and outputs optimal AP coordinate information.

Note that, in the above configuration according to the second embodiment, the input information includes both of the estimated RSSI matrices and the estimated PER matrices. However, the configuration of the present invention is not limited to that of the second embodiment.

When a selection criterion enabling calculation of optimal AP coordinate information based only on the RSSI is selected, the estimated RSSI matrices may be given as the input information. When a selection criterion enabling calculation of optimal AP coordinate information based only on the PER is selected, the estimated PER matrices may be given as the input information. When the relation estimation unit 40 performs learning processing so as to output other information indicating a reception state of radio waves other than the estimated RSSI matrices and the estimated PER matrices, such as estimated throughput matrices, for example, the above-mentioned other information indicating a reception state of radio waves may be given as the input information.

According to the above configuration according to the second embodiment, the post-processing unit 50a generates relation information indicating relation between the information indicating a reception state of radio waves being the input information, such as the estimated RSSI matrices and the estimated PER matrices, and the optimal AP coordinate information for learning being the teaching information, through the learning processing according to a machine learning method. This allows selection of the optimal AP coordinate information among a plurality of pieces of transmit antenna coordinate information for evaluation, without the use of an evaluation function and an evaluation condition related to a deterministic algorithm.

Third Embodiment

Figure 30:
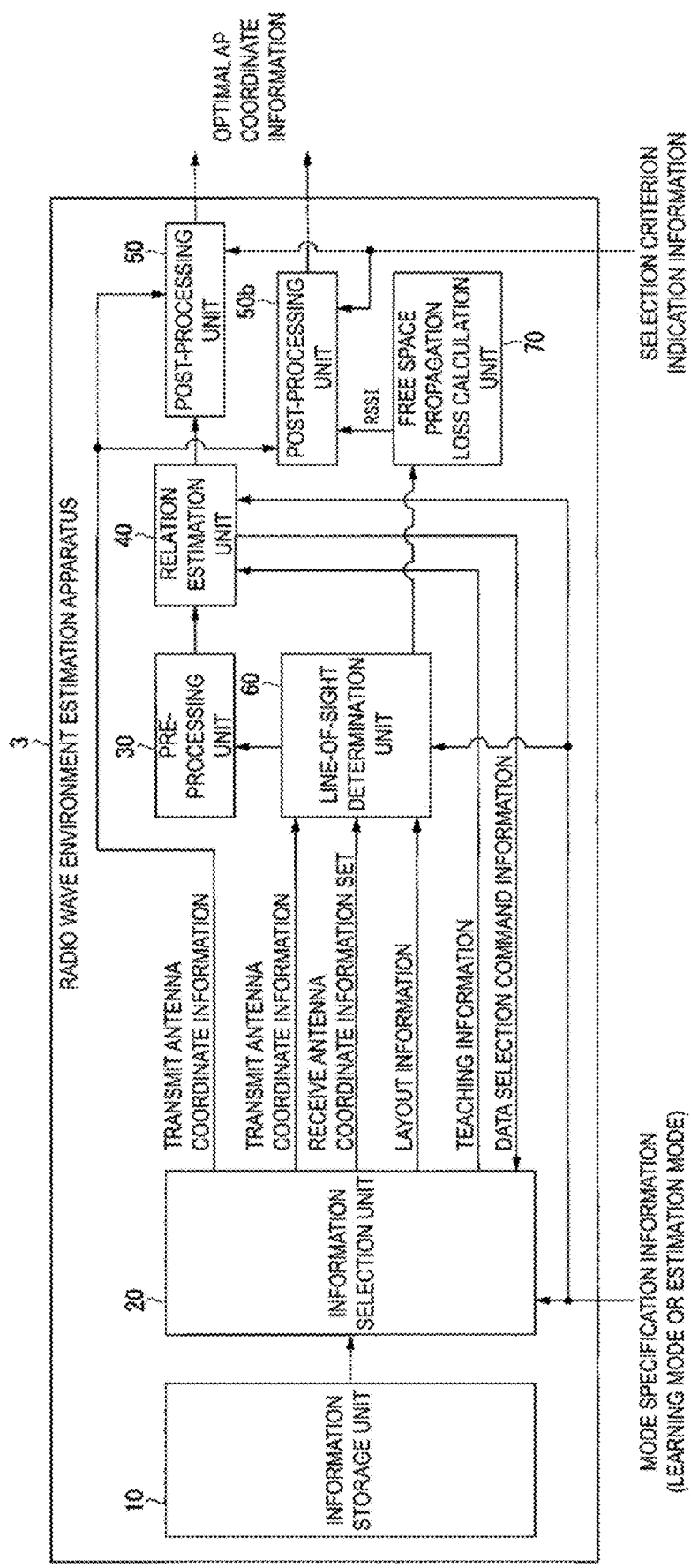
FIG. 30 is a block diagram illustrating a configuration of a radio wave environment estimation apparatus according to a third embodiment.

FIG. 30 is a block diagram illustrating a configuration of a radio wave environment estimation apparatus 3 according to a third embodiment.

The same components as those of the radio wave environment estimation apparatus 1 of the first embodiment are denoted by the same reference signs, and different components will be described below. The radio wave environment estimation apparatus 3 includes an information storage unit 10, an information selection unit 20, a pre-processing unit 30, a relation estimation unit 40, a post-processing unit 50, a line-of-sight determination unit 60, a free space propagation loss calculation unit 70, and a post-processing unit 50b.

In radio communication, in general, when a sender and a receiver have a relationship of a line-of-sight state (Line of Sight (LOS)), direct waves become dominant, and a reception strength value of radio waves received by a receive antenna is dependent on the free space propagation losses, and thus the reception strength value can be calculated based on free space propagation losses.

In contrast, when a sender and a receiver have a relationship of a non-line-of-sight state (Non Line of Sight (NLOS)), indirect waves become dominant for a reception strength value of radio waves received by a receive antenna, and thus it is difficult to calculate the reception strength value based only on free space propagation losses. Thus, the radio wave environment estimation apparatus 3 according to the third embodiment includes a configuration of performing different processes according to a line-of-sight state between a sender and a receiver.

The line-of-sight determination unit 60 acquires transmit antenna coordinate information, a receive antenna coordinate information set, and layout information output by the information selection unit 20. The line-of-sight determination unit 60 determines a line-of-sight state on a path of a straight line between a sender and a receiver, based on the acquired transmit antenna coordinate information, each piece of receive antenna coordinate information included in the acquired receive antenna coordinate information set, and the acquired layout information.

When there is no obstruction on the path of a straight line between the sender and the receiver, the line-of-sight determination unit 60 determines that the state is a line-of-sight state. In contrast, when there is an obstruction on the path of a straight line between the sender and the receiver as illustrated in FIG. 11 described in the first embodiment, for example, the line-of-sight determination unit 60 determines that the state between the sender and the receiver is a non-line-of-sight state.

When the line-of-sight determination unit 60 determines that the state between the sender and the receiver is a line-of-sight state and is given mode specification information indicating an estimation mode from the outside, the line-of-sight determination unit 60 outputs the transmit antenna coordinate information and the receive antenna coordinate information, and the layout information, based on which the line-of-sight state is determined, to the free space propagation loss calculation unit 70. Note that when the line-of-sight determination unit 60 determines that the state between the sender and the receiver is a line-of-sight state and is given mode specification information indicating a learning mode from the outside, the line-of-sight determination unit 60 does not output the transmit antenna coordinate information and the receive antenna coordinate information, and the layout information, based on which the line-of-sight state is determined, to the free space propagation loss calculation unit 70, because learning need not be performed in the line-of-sight state.

The free space propagation loss calculation unit 70 calculates free space propagation loss amounts based on the transmit antenna coordinate information and the receive antenna coordinate information by using the path of a straight line between the sender and the receiver as a propagation distance, in a similar manner to the free space propagation loss calculation unit 300 included in the pre-processing unit 30. The free space propagation loss calculation unit 70 calculates reception strength values of radio waves received by a receive antenna at positions of pieces of receive antenna coordinate information, by using the calculated free space propagation loss amounts. The free space propagation loss calculation unit 70 vertically and horizontally arrays the calculated reception strength values according to the positions of the pieces of receive antenna coordinate information to generate RSSI matrices for respective pieces of transmit antenna coordinate information, and outputs the generated matrices to the post-processing unit 50b.

The post-processing unit 50b includes only some of the evaluation function calculation units 501-1 to N employing an evaluation function to be used for evaluation of only reception strength values, among the evaluation function calculation units 501-1 to N included in the post-processing unit 50 illustrated in FIG. 6. The post-processing unit 50b includes a switch 500 and an output unit 502, as in the post-processing unit 50.

The post-processing unit 50b has a configuration that only RSSI matrices are given as the input information. Due to this configuration, when the post-processing unit 50b is given selection criterion indication information indicating selection of an evaluation function to be used only for the PER or an evaluation function to be used for both of the PER and the reception strength values (RSSI), the post-processing unit 50b cannot calculate evaluation values by applying its evaluation function.

For this reason, when selection criterion indication information indicating selection of an evaluation function to be used only for the PER or an evaluation function to be used for both of the PER and the reception strength values (RSSI) is given, the switch 500 of the post-processing unit 50b does not perform connection between an input terminal of the switch 500 and an output terminal connected to one of the evaluation function calculation units 501-1 to N. Only when the post-processing unit 50b is given selection criterion indication information indicating selection of an evaluation function to be used only for the reception strength values (RSSI), the post-processing unit 50b uses any one of the evaluation function calculation units 501-1 to N according to the selection criterion indication information, and outputs optimal AP coordinate information.

In contrast, when the line-of-sight determination unit 60 determines that the state between the sender and the receiver is a non-line-of-sight state, the line-of-sight determination unit 60 outputs the transmit antenna coordinate information and the receive antenna coordinate information, and the layout information, based on which the line-of-sight state is determined, to the pre-processing unit 30, irrespective of whether mode specification information indicates a learning mode or an estimation mode. In this manner, in a similar manner to the first embodiment, the pre-processing unit 30 generates transmit-receive antenna attenuation matrices and transmit-receive antenna phase matrices, and outputs the generated matrices to the relation estimation unit 40.

When the relation estimation unit 40 is given mode specification information indicating a learning mode from the outside, the relation estimation unit 40 performs learning processing according to a machine learning method. When the relation estimation unit 40 is given mode specification information indicating an estimation mode from the outside, the relation estimation unit 40 generates estimated RSSI matrices and estimated PER matrices, and outputs the generated matrices to the post-processing unit 50. In a similar manner to the first embodiment, the post-processing unit 50 uses any one of the evaluation function calculation units 501-1 to N according to selection criterion indication information given from the outside, and outputs optimal AP coordinate information.

According to the above configuration according to the third embodiment, the line-of-sight determination unit 60 determines whether or not there is an obstruction on a path of a straight line connecting a position of a transmit antenna and a position of a receive antenna, based on the transmit antenna coordinate information, the receive antenna coordinate information, and the layout information. When the line-of-sight determination unit 60 determines that there is an obstruction, the post-processing unit 50 evaluates the position of the transmit antenna for evaluation, based on the information indicating a reception state of radio waves calculated by the relation estimation unit 40. When the line-of-sight determination unit 60 determines that there is no obstruction, the post-processing unit 50*b* calculates a reception strength value, at the position of the receive antenna, of direct waves propagating on the path of the straight line connecting the position indicated by the transmit antenna coordinate information for evaluation and the position of the receive antenna for each piece of receive antenna coordinate information, and evaluates the position of the transmit antenna for evaluation by using the calculated reception strength value. In this manner, the processing load applied when the relation estimation unit 40 generates the relation information indicating relation can be reduced to a minimum necessary amount, and further, a computation period of time can be reduced.

Note that, although the post-processing unit 50 and the post-processing unit 50*b* are provided in the above third embodiment, the post-processing unit 50 and the post-processing unit 50*b* may be integrally configured. In this case, the switch 500 includes two input terminals. One input terminal is connected to the relation estimation unit 40, and the other input terminal is connected to the free space propagation loss calculation unit 70. In such a configuration, the switch 500 performs switching processing of performing connection to an appropriate one of the evaluation function calculation units 501-1 to N, depending on a case where the relation estimation unit 40 outputs the estimated RSSI matrices and the estimated PER matrices or a case where the free space propagation loss calculation unit 70 outputs the reception strength values (RSSI).

In the above configuration according to the third embodiment, the information storage unit 10*a*, the information selection unit 20*a*, and the post-processing unit 50*a* of the second embodiment may be used instead of the post-processing unit 50, and the post-processing unit 50*a* may perform learning processing according to a machine learning method.

In the each of the above embodiments (first embodiment to third embodiment), actually measured values are used as the teaching information of information indicating a reception state of radio waves. However, the information indicating a reception state of radio waves used as the teaching information is not necessarily limited to the above information. For example, information indicating a reception state of radio waves obtained with a method other than actual measurement may be used as the teaching information. Examples of the information indicating a reception state of radio waves obtained with a method other than actual measurement include estimation information of an RSSI, a PER, throughput, a BER, a delay profile, an SNR, an SINR, a CNR, and a CINR, which is calculated in advance through a simulation such as ray tracing. Even when simulation is used, features of the present invention that an optimal transmit antenna installation position can be estimated in consideration of influence from indirect waves with a certain calculation period of time irrespective of the number of obstructions, which are also effects of the present invention, are not deteriorated, because teaching information is not used in the relation estimation unit 40.

In the configuration of each of the above embodiments (first embodiment to third embodiment), determination processing using a sign of inequality is performed in the processing of Step Sa6 illustrated in FIG. 7, for example. However, the present invention is not limited to those embodiments, and determination processing as to "whether or not a value is greater than a threshold". "whether or not a value is less than a threshold", "whether or not a value is equal to or greater than a threshold", and "whether or not a value is equal to or less than a threshold" is merely an example. Depending on how a threshold is set, the above determination processing may be respectively replaced by "whether or not a value is equal to or greater than a threshold", "whether or not a value is equal to or less than a threshold". "whether or not a value is greater than a threshold", and "whether or not a value is less than a threshold". The threshold used in the determination processing is also merely an example, and a different threshold may be used for each threshold. In other words, in the above threshold determination processing, whether or not a value to be determined is equal to or greater than a threshold may be determined.

The radio wave environment estimation apparatuses 1, 2, and 3 in the embodiments described above may be implemented with a computer. In such a case, the radio wave environment estimation apparatuses 1, 2, and 3 may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. Specific configurations, however, are not limited to those embodiments, and include any design or the like within the scope not departing from the gist of the present invention.

REFERENCE SIGNS LIST

1 Radio wave environment estimation apparatus
10 Information storage unit
20 Information selection unit 30 Pre-processing unit
40 Relation estimation unit
50 Post-processing unit

The invention claimed is:

1. A radio wave environment estimation method comprising:
a pre-processing step of calculating a synthetic reception strength value in a case of synthesizing indirect waves of radio waves generated due to an obstruction by using transmit antenna coordinate information, receive antenna coordinate information, and layout information, the transmit antenna coordinate information indicating a position of a transmit antenna being configured to transmit the radio waves, the receive antenna coordinate information indicating a position of a receive antenna being configured to receive the radio waves, the layout information indicating a position at which the obstruction interfering with propagation of the radio waves is located, the synthetic reception strength value being calculated for each piece of the receive antenna coordinate information in consideration of at least one of a phase or a propagation distance of each of the indirect waves;
a relation information generation step of generating relation information indicating relation between input information and teaching information, the input information being the synthetic reception strength value for each piece of the receive antenna coordinate information corresponding to the transmit antenna coordinate information, the teaching information being information indicating a reception state of the radio waves acquired using at least one of a method of actually measuring the radio waves output by the transmit antenna at the position of the receive antenna or a method other than the method of the actual measurement; and
an estimation step of estimating strength of the radio waves by calculating the information indicating the reception state of the radio waves by using the transmit antenna coordinate information for evaluation and the generated relation information.

2. The radio wave environment estimation method according to claim 1, further comprising
a post-processing step of evaluating the position of the transmit antenna for evaluation by using the information indicating the reception state of the radio waves calculated in the estimation step.

3. The radio wave environment estimation method according to claim 2, further comprising
a line-of-sight determination step of determining whether or not the obstruction is present on a path of a straight line connecting the position of the transmit antenna and the position of the receive antenna by using the transmit antenna coordinate information, the receive antenna coordinate information, and the layout information,
wherein, in the post-processing step,
when it is determined in the line-of-sight determination step that the obstruction is present, the position of the transmit antenna for evaluation is evaluated by using the information indicating the reception state of the radio waves calculated in the estimation step, and
when it is determined in the line-of-sight determination step that the obstruction is not present, a reception strength value of direct waves at the position of the receive antenna is calculated for each piece of the receive antenna coordinate information, the direct waves propagating on the path of the straight line connecting the position indicated by the transmit antenna coordinate information for evaluation and the position of the receive antenna, and the position of the transmit antenna for evaluation is evaluated by using the calculated reception strength value.

4. The radio wave environment estimation method according to claim 2,
wherein, in the relation information generation step,
the relation information indicating the relation between the input information and the teaching information is generated through learning processing according to a machine learning method.

5. The radio wave environment estimation method according to claim 2,
wherein, in the post-processing step,
relation information indicating relation between a plurality of pieces of the information indicating the reception state of the radio waves calculated by using a plurality of pieces of the transmit antenna coordinate information and the generated relation information and the transmit antenna coordinate information indicating a predetermined optimal position of the transmit antenna is generated in the estimation step through learning processing according to a machine learning method, and,
an optimal piece of the transmit antenna coordinate information is output out of the plurality of pieces of the transmit antenna coordinate information for evaluation, based on the generated relation information and the information indicating the reception state of the radio waves, or
an evaluation value for each piece of the transmit antenna coordinate information for evaluation is calculated by applying a predetermined evaluation function to the information indicating the reception state of the radio waves, and an optimal piece of the transmit antenna coordinate information is output out of the plurality of pieces of the transmit antenna coordinate information for evaluation, based on the calculated evaluation value.

6. The radio wave environment estimation method according to claim 2,
wherein, in the pre-processing step, a reception strength value of direct waves is calculated for each piece of the receive antenna coordinate information, the direct waves propagating on a path of a straight line between the position of the transmit antenna and the position of the receive antenna, and
in the relation estimation step, in addition to the synthetic reception strength value for each piece of the receive antenna coordinate information corresponding to the transmit antenna coordinate information, the reception strength value of the direct waves for each piece of the receive antenna coordinate information corresponding to the transmit antenna coordinate information is used as the input information.

7. The radio wave environment estimation method according to claim 2,
wherein the information indicating the reception state of the radio waves being actually measured is at least one of any one piece of information, all of pieces of information, or freely selected two pieces of information among information of an RSSI, information of a PER, throughput information, information of a BER, information of a delay profile, information of an SNR, information of an SINR, information of a CNR, and information of a CINR.

8. The radio wave environment estimation method according to claim 2,
wherein, in the pre-processing step, when the indirect waves are reflected waves generated due to the obstruction, a propagation distance of each of the reflected waves is calculated by using an ellipse having focal points at the position of the transmit antenna and the position of the receive antenna and circumference tangent to the obstruction, a free space propagation loss amount and a phase rotation amount of each of the reflected waves at the position of the receive antenna are calculated by using the calculated propagation distance, and the synthetic reception strength value is calculated by using the calculated free space propagation loss amount and the calculated phase rotation amount.

9. A radio wave environment estimation apparatus comprising:
a processor; and
a storage medium having computer program instructions stored thereon, where executed by the processor, perform to:
calculate a synthetic reception strength value in a case of synthesizing indirect waves of radio waves generated due to an obstruction by using transmit antenna coordinate information, receive antenna coordinate information, and layout information, the transmit antenna coordinate information indicating a position of a transmit antenna being configured to transmit the radio waves, the receive antenna coordinate information indicating a position of a receive antenna being configured to receive the radio waves, the layout information indicating a position at which the obstruction interfering with propagation of the radio waves is located, the synthetic reception strength value being calculated for each piece of the receive antenna coordinate information in consideration of at least one of a phase or a propagation distance of each of the indirect waves; and
generate relation information indicating relation between input information and teaching information, the input information being the synthetic reception strength value for each piece of the receive antenna coordinate information corresponding to the transmit antenna coordinate information, the teaching information being information indicating a reception state of the radio waves being acquired using at least one of a method of actually measuring the radio waves output by the transmit antenna at the position of the receive antenna or a method other than the method of the actual measurement, and being configured to estimate strength of the radio waves by calculating the information indicating the reception state of the radio waves by using the transmit antenna coordinate information for evaluation and the generated relation information.

* * * * *